United States Patent
Nguyen et al.

(10) Patent No.: US 12,402,088 B2
(45) Date of Patent: *Aug. 26, 2025

(54) CONCURRENT PHYSICAL SIDELINK FEEDBACK CHANNEL TRANSMISSION

(71) Applicant: QUALCOMM Incorporated, San Diego, CA (US)

(72) Inventors: Tien Viet Nguyen, Bridgewater, NJ (US); Sudhir Kumar Baghel, Pleasanton, CA (US); Kapil Gulati, Belle Mead, NJ (US); Gabi Sarkis, San Diego, CA (US); Junyi Li, Fairless Hills, PA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,948

(22) Filed: Nov. 22, 2022

(65) Prior Publication Data

US 2023/0102355 A1    Mar. 30, 2023

Related U.S. Application Data

(63) Continuation of application No. 16/948,798, filed on Oct. 1, 2020, now Pat. No. 11,558,830.
(Continued)

(51) Int. Cl.
*H04W 72/04* (2023.01)
*H04B 17/318* (2015.01)
(Continued)

(52) U.S. Cl.
CPC .......... *H04W 52/46* (2013.01); *H04B 17/318* (2015.01); *H04L 1/1614* (2013.01);
(Continued)

(58) Field of Classification Search
CPC ..... H04W 52/46; H04W 52/367; H04W 8/24; H04W 24/10; H04W 92/18; H04B 17/318;
(Continued)

(56) References Cited

U.S. PATENT DOCUMENTS

2020/0205166 A1* 6/2020 Huang ................ H04W 76/27
2020/0344722 A1 10/2020 He et al.
(Continued)

FOREIGN PATENT DOCUMENTS

CN    109792594 A    5/2019
CN    109891981 A    6/2019
(Continued)

OTHER PUBLICATIONS

International Search Report and Written Opinion—PCT/US2020/053931—ISA/EPO—dated Jan. 13, 2021.
(Continued)

*Primary Examiner* — Mahbubul Bar Chowdhury
(74) *Attorney, Agent, or Firm* — Harrity & Harrity, LLP

(57) ABSTRACT

Various aspects of the present disclosure generally relate to wireless communication. In some aspects, a user equipment (UE) may identify multiple candidate sets of physical sidelink feedback channel (PSFCH) transmissions that include hybrid automatic repeat request (HARQ) feedback for sidelink communications received from one or more peer UEs. The UE may select, from one or more of the multiple candidate sets that satisfy a PSFCH transmit power constraint, at least one candidate set that has a highest value for a utility parameter among utility parameters associated with each of the one or more candidate sets that satisfy a PSFCH transmit power constraint. The UE may transmit, on a PSFCH, the plurality of PSFCH transmissions included in
(Continued)

the at least one candidate set in a HARQ feedback occasion. Numerous other aspects are provided.

30 Claims, 14 Drawing Sheets

Related U.S. Application Data

(60) Provisional application No. 62/909,553, filed on Oct. 2, 2019.

(51) Int. Cl.
| | | |
|---|---|---|
| *H04L 1/1607* | (2023.01) | |
| *H04L 1/1812* | (2023.01) | |
| *H04L 5/00* | (2006.01) | |
| *H04W 8/24* | (2009.01) | |
| *H04W 24/10* | (2009.01) | |
| *H04W 52/36* | (2009.01) | |
| *H04W 52/46* | (2009.01) | |
| *H04W 92/18* | (2009.01) | |

(52) U.S. Cl.
CPC .......... *H04L 1/1819* (2013.01); *H04L 5/0055* (2013.01); *H04W 8/24* (2013.01); *H04W 24/10* (2013.01); *H04W 52/367* (2013.01); *H04W 92/18* (2013.01)

(58) Field of Classification Search
CPC ... H04L 1/1614; H04L 1/1819; H04L 1/1854; H04L 1/1861; H04L 5/0055
See application file for complete search history.

(56) References Cited

U.S. PATENT DOCUMENTS

| | | | | |
|---|---|---|---|---|
| 2020/0351032 | A1* | 11/2020 | Wu | H04W 72/20 |
| 2020/0351033 | A1 | 11/2020 | Ryu et al. | |
| 2020/0403737 | A1 | 12/2020 | Yeo et al. | |
| 2021/0050950 | A1* | 2/2021 | Zhou | H04W 76/14 |
| 2021/0105126 | A1* | 4/2021 | Yi | H04L 1/1671 |
| 2021/0105728 | A1 | 4/2021 | Nguyen et al. | |
| 2021/0329568 | A1* | 10/2021 | Zhang | H04W 4/70 |
| 2022/0232520 | A1* | 7/2022 | Yoshioka | H04W 72/0453 |
| 2022/0248425 | A1* | 8/2022 | Lee | H04W 72/1263 |
| 2022/0272666 | A1* | 8/2022 | Ji | H04L 5/0053 |
| 2022/0287044 | A1* | 9/2022 | Yoshioka | H04L 1/1812 |
| 2022/0345249 | A1* | 10/2022 | Yoshioka | H04L 1/1861 |

FOREIGN PATENT DOCUMENTS

| | | | | |
|---|---|---|---|---|
| WO | 2019151915 | A1 | 8/2019 | |
| WO | WO-2020221206 | A1 * | 11/2020 | ........... H04L 1/1607 |

OTHER PUBLICATIONS

OPPO: "Physical Layer Procedure far NR-V2X Sidelink", 3GPP Draft, 3GPP TSG RAN WG1 #98, R1-1908364 PHY Layer Procedure, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), XP051764972, 13 Pages, Sections 1-6, p. 5, Paragraph 2.5 p. 6, Paragraphs 2.5-2.6.
Vivo: "Layer procedure for NR Sidelink", 3GPP Draft, (Draft) R1-1908154, 3GPP TSG RAN WG1 Meeting #98, Physical Layer Procedure for NR Side Link, 3rd Generation Partnership Project (3GPP), Mobile Competence Centre, 650, Route Des Lucioles, F-06921 Sophia-Antipolis Cedex, vol. RAN WG1, No. Prague, CZ, Aug. 26, 2019-Aug. 30, 2019, Aug. 17, 2019 (Aug. 17, 2019), XP051764773, pp. 1-20, The Whole Document, p. 9, Paragraph 3.5 p. 5, Case 3.
ASUSTEK: "Discussion on Sidelink Physical Layer Procedure on NR V2X", 3GPP TSG RAN WG1 #98, R1-1909212, Prague, CZ, Aug. 26-30, 2019, 9 Pages.
International Search Report and Written Opinion—PCT/US2020/053931—ISA/EPO—Jan. 13, 2021.
Mediatek Inc: "Discussion on V2X Physical Layer Procedure", 3GPP Draft, 3GPP TSG RAN WG1 #96bis, R1-1904497, V2X_Physical Layer_Procedure, 3rd Generation Partnership Project (3GPP), Mobile Competence Centre, 650, Route Des Lucioles, F-06921 Sophia-Antipolis Cedex, France, vol. Ran WG1, No. Xian, China, Apr. 8, 2019-Apr. 12, 2019, Apr. 3, 2019 (Apr. 3, 2019), 7 Pages, XP051707237, section 2.1.
Mediatek Inc: "Physical Layer Procedures for Sidelink," 3GPP Draft, 3GPP TSG RAN WG1 #98, R1-1908401, V2X Physical Layer Procedure Final, 3rd Generation Partnership Project (3GPP), Mobile Competence Centre, 650, Route Des Lucioles, F-06921, Sophia-Antipolis Cedex, France, vol. RAN WG1, No. Prague, CZ; Aug. 26, 2019-Aug. 30, 2019, Aug. 17, 2019 (Aug. 17, 2019), XP051765010, 16 pages, Section 2.1-2.3, Sections 3. 3.1.2. 3.1.4. 3.2.1, Section 4.
OPPO: "Physical Layer Procedure for NR-V2X Sidelink", 3GPP Draft, 3GPP TSG RAN WG1 #98, R1-1908364 Phy Layer Procedure, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), XP051764972, 13 Pages, Sections 1-6, p. 5, Paragraph 2.5 p. 6, Paragraphs 2.5-2.6.
TCL Communication: "Physical Layer Procedures for Sidelink", 3GPP TSG RAN WG1 Meeting #98, R1-1908279, Prague, Czech Republic, Aug. 26-30, 2019, 14 Pages.
VIVO: "Physical Layer Procedure for NR Sidelink", 3GPP Draft, (Draft) R1-1908154, 3GPP TSG RAN WG1 Meeting #98, Physical Layer Procedure for NR Side Link, 3rd Generation Partnership Project (3GPP), Mobile Competence Centre, 650, Route Des Lucioles, F-06921 Sophia-Antipolis Cedex, vol. RAN WG1, No. Prague, CZ, Aug. 26, 2019-Aug. 30, 2019, Aug. 17, 2019 (Aug. 17, 2019), XP051764773, pp. 1-20, The Whole Document, p. 9, Paragraph 3.5 p. 5, Case 3.
NTT DOCOMO, Inc: "Sidelink Physical Layer Procedure for NR V2X", 3GPP TSG RAN WG1 #98, R1-1909190, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, XP051765795, pp. 1-14, p. 3, Proposal 2 p. 4, Proposal 3 p. 7, Proposal 7, Section 2.2, p. 8-p. 9; figure 4, section 2.1.
Taiwan Search Report—TW109134409—TIPO—Mar. 26, 2024.
European Search Report—EP25176069—Search Authority—The Hague—Jun. 24, 2025.

* cited by examiner

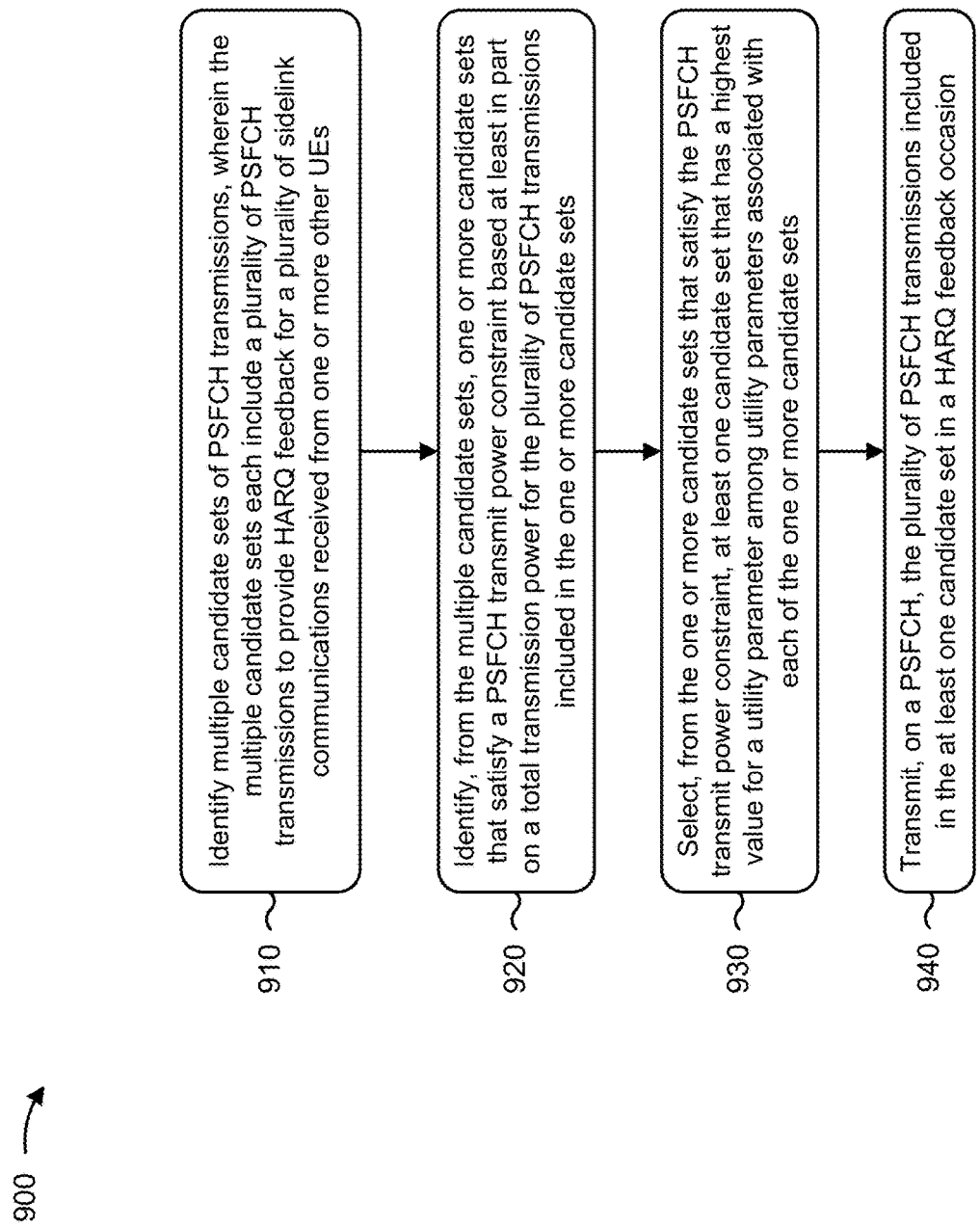

CONCURRENT PHYSICAL SIDELINK FEEDBACK CHANNEL TRANSMISSION

CROSS-REFERENCE TO RELATED APPLICATION

This application is a continuation of U.S. patent application Ser. No. 16/948,798, filed Oct. 1, 2020, entitled "CONCURRENT PHYSICAL SIDELINK FEEDBACK CHANNEL TRANSMISSION," which claims priority to U.S. Provisional Patent Application No. 62/909,553, filed on Oct. 2, 2019, entitled "CONCURRENT PHYSICAL SIDELINK FEEDBACK CHANNEL TRANSMISSION," the contents of which are incorporated herein by reference in their entireties.

FIELD OF THE DISCLOSURE

Aspects of the present disclosure generally relate to wireless communication and to techniques and apparatuses for concurrent physical sidelink feedback channel (PSFCH) transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: identifying multiple candidate sets of physical sidelink feedback channel (PSFCH) transmissions, wherein the multiple candidate sets each include a plurality of PSFCH transmissions to provide hybrid automatic repeat request (HARQ) feedback for a plurality of sidelink communications received from one or more other UEs; identifying, from the multiple candidate sets, one or more candidate sets that satisfy a PSFCH transmit power constraint based at least in part on a total transmission power for the plurality of PSFCH transmissions included in the one or more candidate sets; selecting, from the one or more candidate sets that satisfy the PSFCH transmit power constraint, at least one candidate set that has a highest value for a utility parameter among utility parameters associated with each of the one or more candidate sets; and transmitting, on a PSFCH, the plurality of PSFCH transmissions included in the at least one candidate set in a HARQ feedback occasion.

In some aspects, a UE for wireless communication may include a memory and one or more processors operatively coupled to the memory. The memory and the one or more processors may be configured to: identify multiple candidate sets of PSFCH transmissions, wherein the multiple candidate sets each include a plurality of PSFCH transmissions to provide HARQ feedback for a plurality of sidelink communications received from one or more other UEs; identify, from the multiple candidate sets, one or more candidate sets that satisfy a PSFCH transmit power constraint based at least in part on a total transmission power for the plurality of PSFCH transmissions included in the one or more candidate sets; select, from the one or more candidate sets that satisfy the PSFCH transmit power constraint, at least one candidate set that has a highest value for a utility parameter among utility parameters associated with each of the one or more candidate sets; and transmit, on a PSFCH, the plurality of PSFCH transmissions included in the at least one candidate set in a HARQ feedback occasion.

In some aspects, a non-transitory computer-readable medium may store one or more instructions for wireless communication. The one or more instructions, when executed by one or more processors of a UE, may cause the one or more processors to: identify multiple candidate sets of PSFCH transmissions, wherein the multiple candidate sets each include a plurality of PSFCH transmissions to provide HARQ feedback for a plurality of sidelink communications received from one or more other UEs; identify, from the multiple candidate sets, one or more candidate sets that satisfy a PSFCH transmit power constraint based at least in part on a total transmission power for the plurality of PSFCH transmissions included in the one or more candidate sets; select, from the one or more candidate sets that satisfy the PSFCH transmit power constraint, at least one candidate set that has a highest value for a utility parameter among utility parameters associated with each of the one or more candidate sets; and transmit, on a PSFCH, the plurality of PSFCH transmissions included in the at least one candidate set in a HARQ feedback occasion.

In some aspects, an apparatus for wireless communication may include: means for identifying multiple candidate sets of PSFCH transmissions, wherein the multiple candidate sets each include a plurality of PSFCH transmissions to provide HARQ feedback for a plurality of sidelink communications received from one or more other UEs; means for identifying, from the multiple candidate sets, one or more candidate sets that satisfy a PSFCH transmit power constraint based at least in part on a total transmission power for the plurality of PSFCH transmissions included in the one or more candidate sets; means for selecting, from the one or more candidate sets that satisfy the PSFCH transmit power constraint, at least one candidate set that has a highest value for a utility parameter among utility parameters associated with each of the one or more candidate sets; and means for transmitting, on a PSFCH, the plurality of PSFCH transmissions included in the at least one candidate set in a HARQ feedback occasion.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
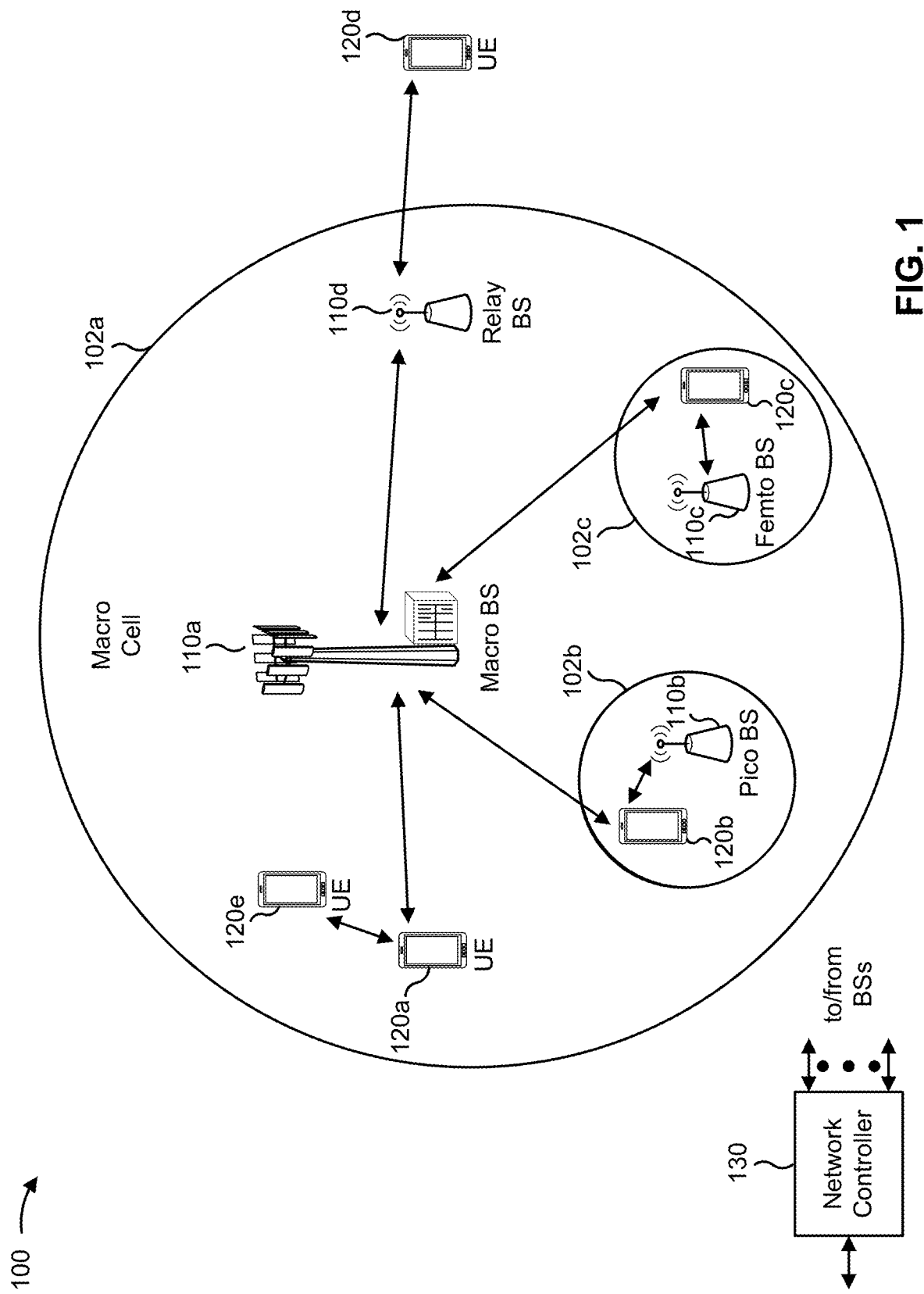
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
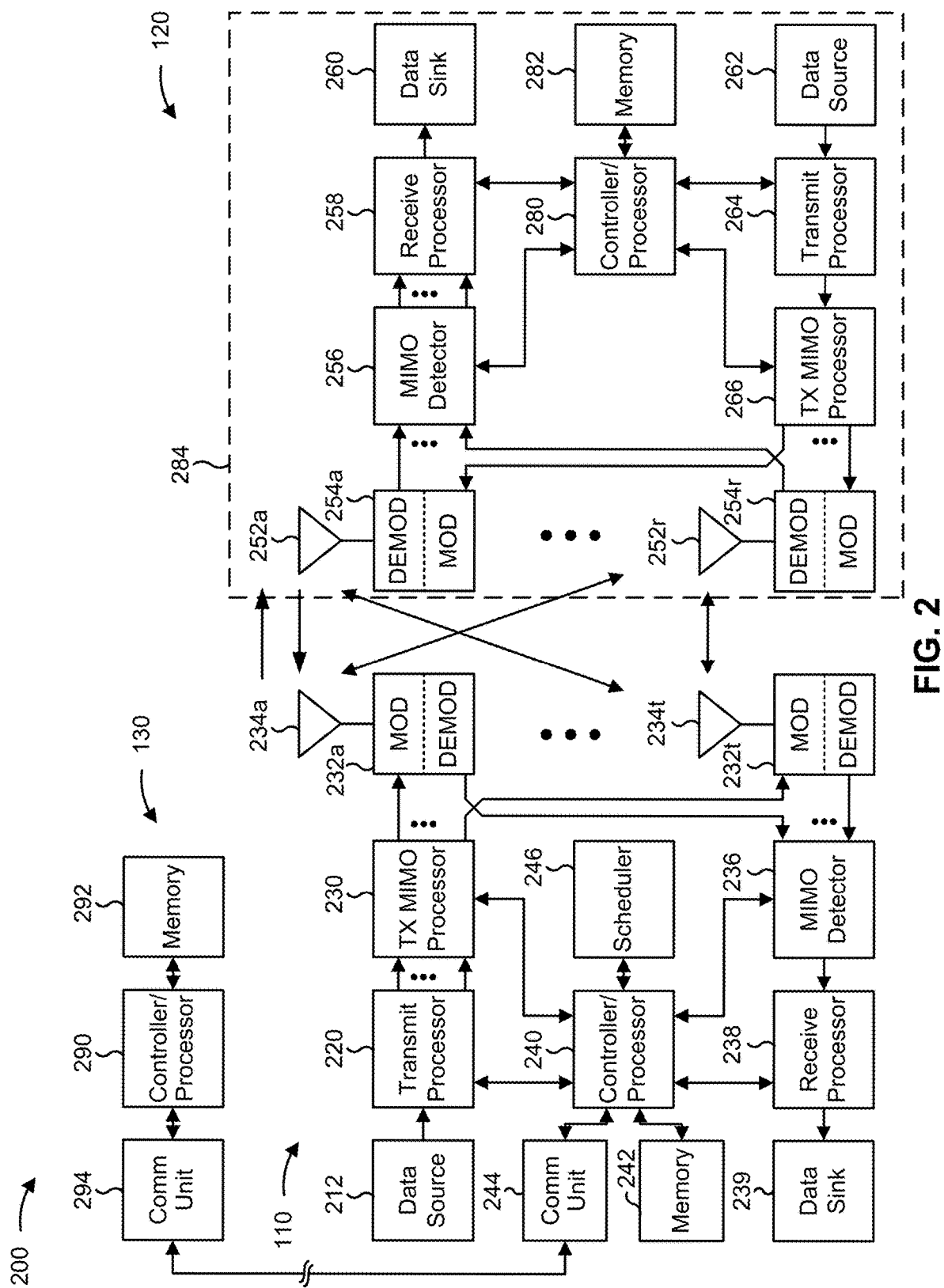
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with concurrent physical sidelink feedback channel (PSFCH) transmission, as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9 and/or other processes as described herein. In some aspects, executing instructions may include running the instructions, converting the instructions, compiling the instructions, interpreting the instructions, and/or the like.

In some aspects, UE 120 may include means for identifying multiple candidate sets of PSFCH transmissions, wherein the multiple candidate sets each include a plurality of PSFCH transmissions to provide hybrid automatic repeat request (HARQ) feedback for a plurality of sidelink communications received from one or more other UEs 120, means for identifying, from the multiple candidate sets, one or more candidate sets that satisfy a PSFCH transmit power constraint based at least in part on a total transmission power for the plurality of PSFCH transmissions included in the one or more candidate sets, means for selecting, from the one or more candidate sets that satisfy the PSFCH transmit power constraint, at least one candidate set that has a highest value for a utility parameter among utility parameters associated with each of the one or more candidate sets, means for transmitting, on a PSFCH, the plurality of PSFCH transmissions included in the at least one candidate set in a HARQ feedback occasion, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
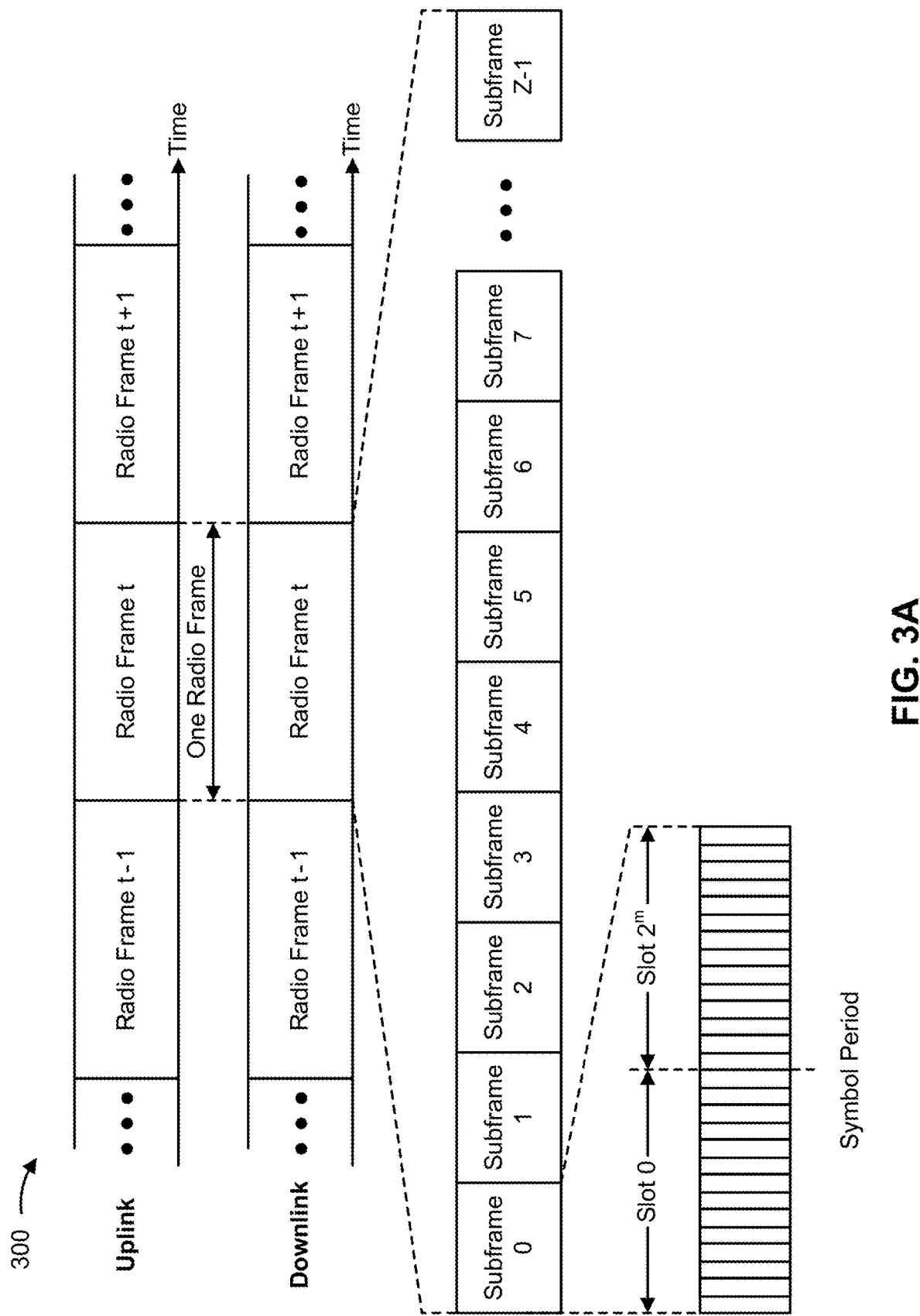
FIG. 3A is a diagram illustrating an example frame structure in a wireless network, in accordance with various aspects of the present disclosure.

FIG. 3A is a diagram illustrating an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
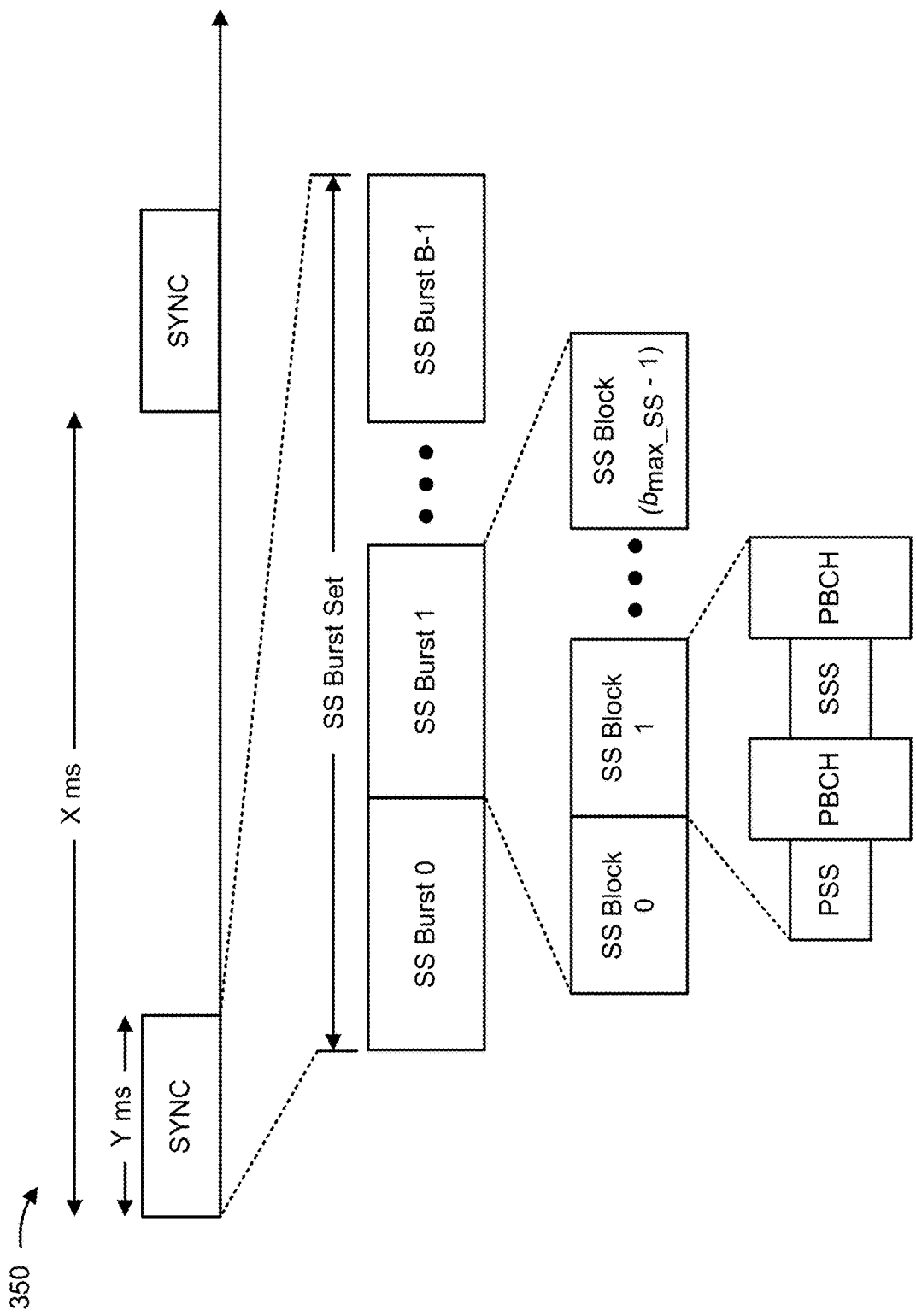
FIG. 3B is a diagram illustrating an example synchronization communication hierarchy in a wireless network, in accordance with various aspects of the present disclosure.

FIG. 3B is a diagram illustrating an example SS hierarchy 350, which is an example of a synchronization communication hierarchy. As shown in FIG. 3B, the SS hierarchy 350 may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$-1), where $b_{max\_SS}$-1 Is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
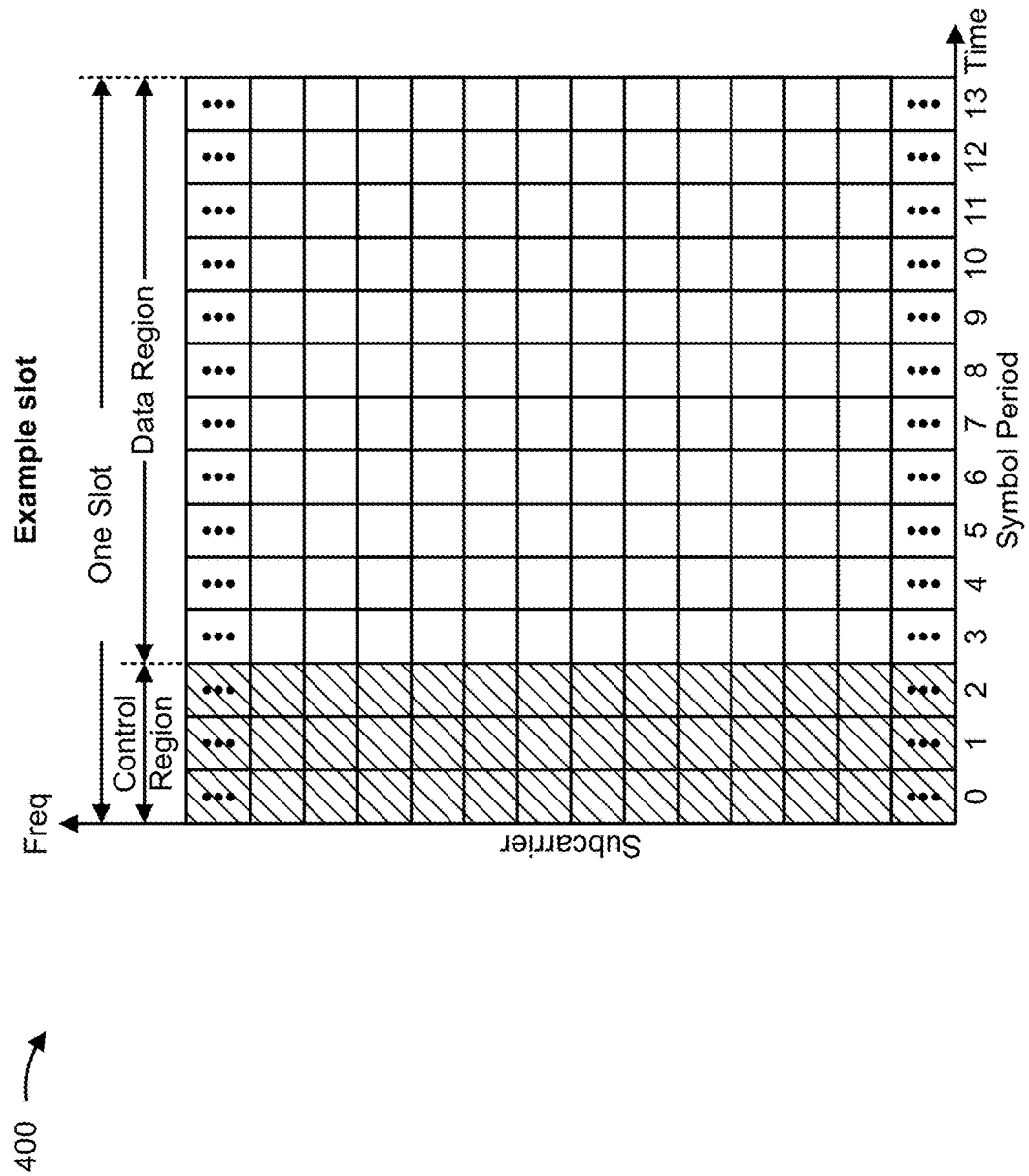
FIG. 4 is a diagram illustrating an example slot format with a normal cyclic prefix, in accordance with various aspects of the present disclosure.

FIG. 4 shows an example slot format 400 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communication (URLLC) service.

In some aspects, a single component carrier bandwidth of 100 MHz may be supported. NR resource blocks may span 12 subcarriers with a subcarrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
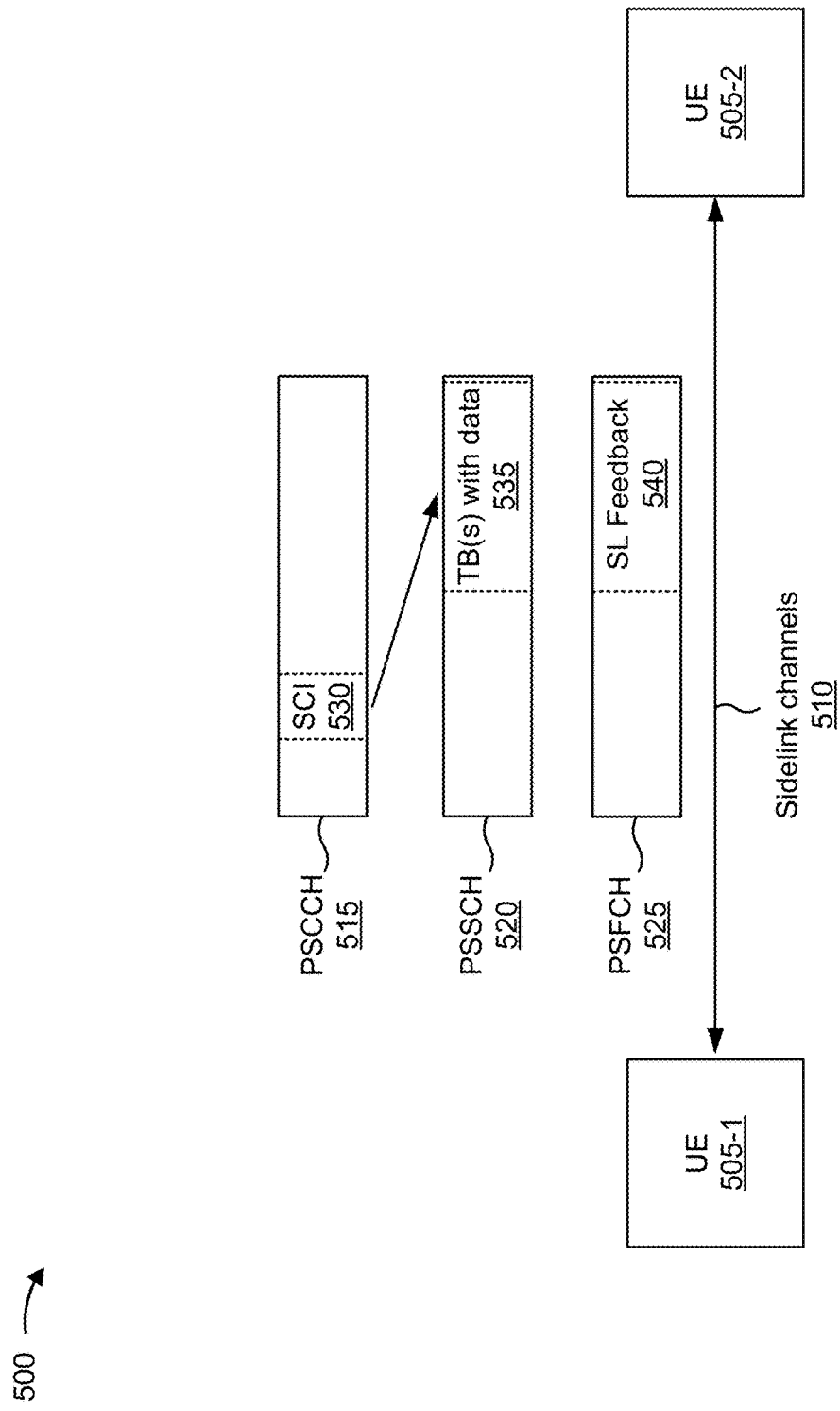
FIG. 5 is a diagram illustrating an example of sidelink communications, in accordance with various aspects of the present disclosure.

FIG. 5 is a diagram illustrating an example 500 of sidelink communications, in accordance with various aspects of the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for P2P communications, D2D communications, V2X communications (e.g., which may include V2V communications, V2I communications, V2P communications, and/or the like), mesh networking, and/or the like. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, symbols, and/or the like) using global navigation satellite system (GNSS) timing.

As further shown in FIG. 5, the one or more sidelink channels 510 may include a physical sidelink control channel (PSCCH) 515, a physical sidelink shared channel (PSSCH) 520, and/or a PSFCH 525. The PSCCH 515 may be used to communicate control information, similar to a PDCCH and/or a physical uplink control channel (PUCCH) used for cellular communications with a base station 110 via an access link or an access channel. The PSSCH 520 may be used to communicate data, similar to a PDSCH and/or a physical uplink shared channel (PUSCH) used for cellular communications with a base station 110 via an access link or an access channel. For example, the PSCCH 515 may carry sidelink control information (SCI) 530, which may indicate various control information used for sidelink communications, such as one or more resources (e.g., time resources, frequency resources, spatial resources, and/or the like) where a transport block (TB) 535 may be carried on the PSSCH 520. The TB 535 may include data. The PSFCH 525 may be used to communicate sidelink feedback 540, such as HARQ feedback (e.g., acknowledgement or negative acknowledgement (ACK/NACK) information), transmit power control (TPC), a scheduling request (SR), and/or the like.

In some aspects, the one or more sidelink channels 510 may use resource pools. For example, a scheduling assignment (e.g., included in SCI 530) may be transmitted in sub-channels using specific resource blocks (RBs) across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a transmission mode where resource selection and/or scheduling is performed by the UE 505 (e.g., rather than a base station 110). In some aspects, the UE 505 may perform resource selection and/or scheduling by sensing channel availability for transmissions. For example, the UE 505 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources, channel parameters, and/or the like. Additionally, or alternatively, the UE 505 may perform resource selection and/or scheduling by determining a channel busy rate (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, a modulation and coding scheme (MCS) to be used for the upcoming sidelink transmission, and/or the like. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

As indicated above, FIG. 5 is provided as an example. Other examples may differ from what is described with respect to FIG. 5.

Figure 6:
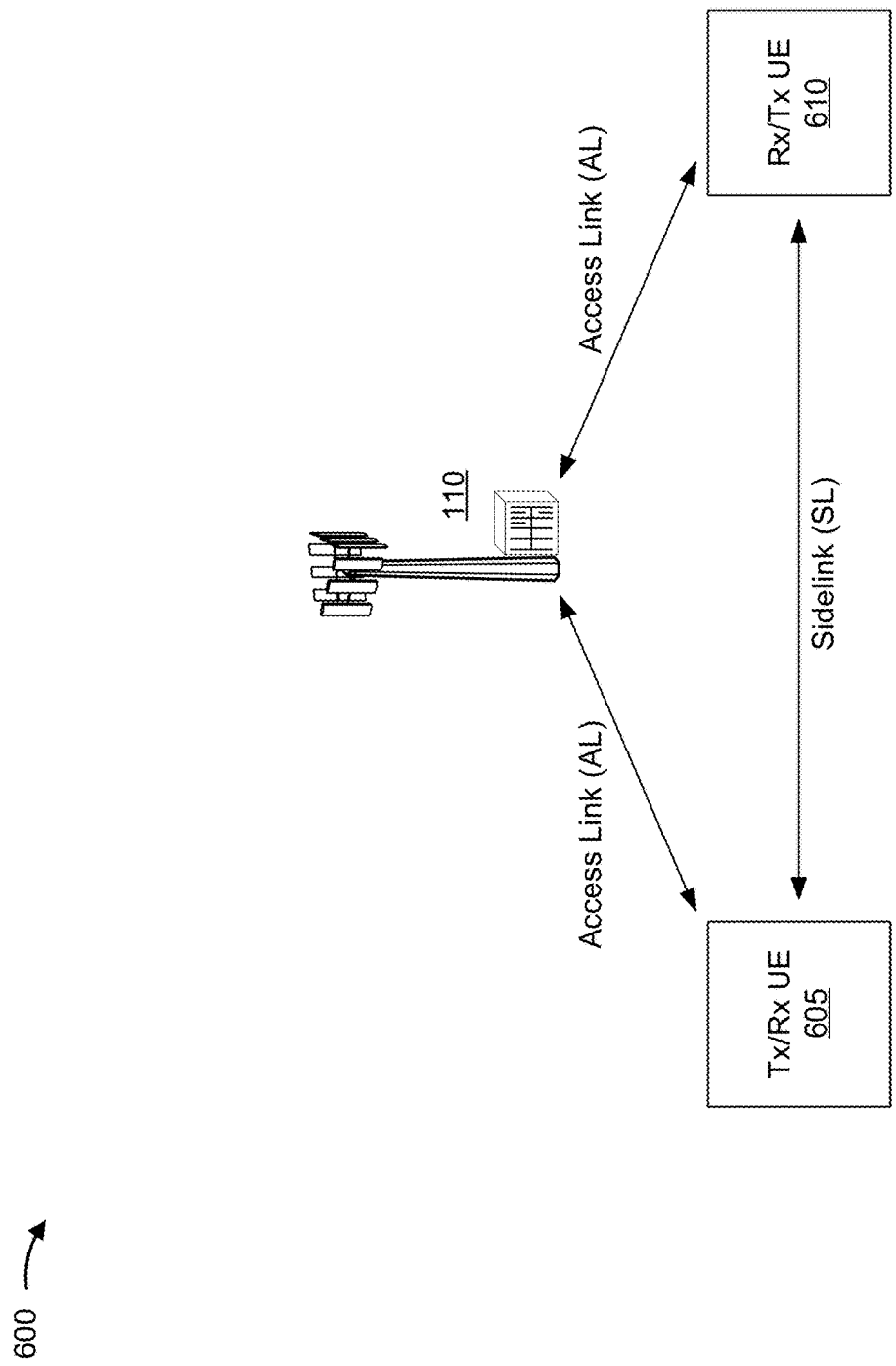
FIG. 6 is a diagram illustrating an example of sidelink communications and access link communications, in accordance with various aspects of the present disclosure.

FIG. 6 is a diagram illustrating an example 600 of sidelink communications and access link communications, in accordance with various aspects of the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a base station 110 may communicate with the Tx/Rx UE 605 via a first access link. Additionally, or alternatively, in some sidelink modes, the base station 110 may communicate with the Rx/Tx UE 610 via a second access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 6 is provided as an example. Other examples may differ from what is described with respect to FIG. 6.

Figure 7:
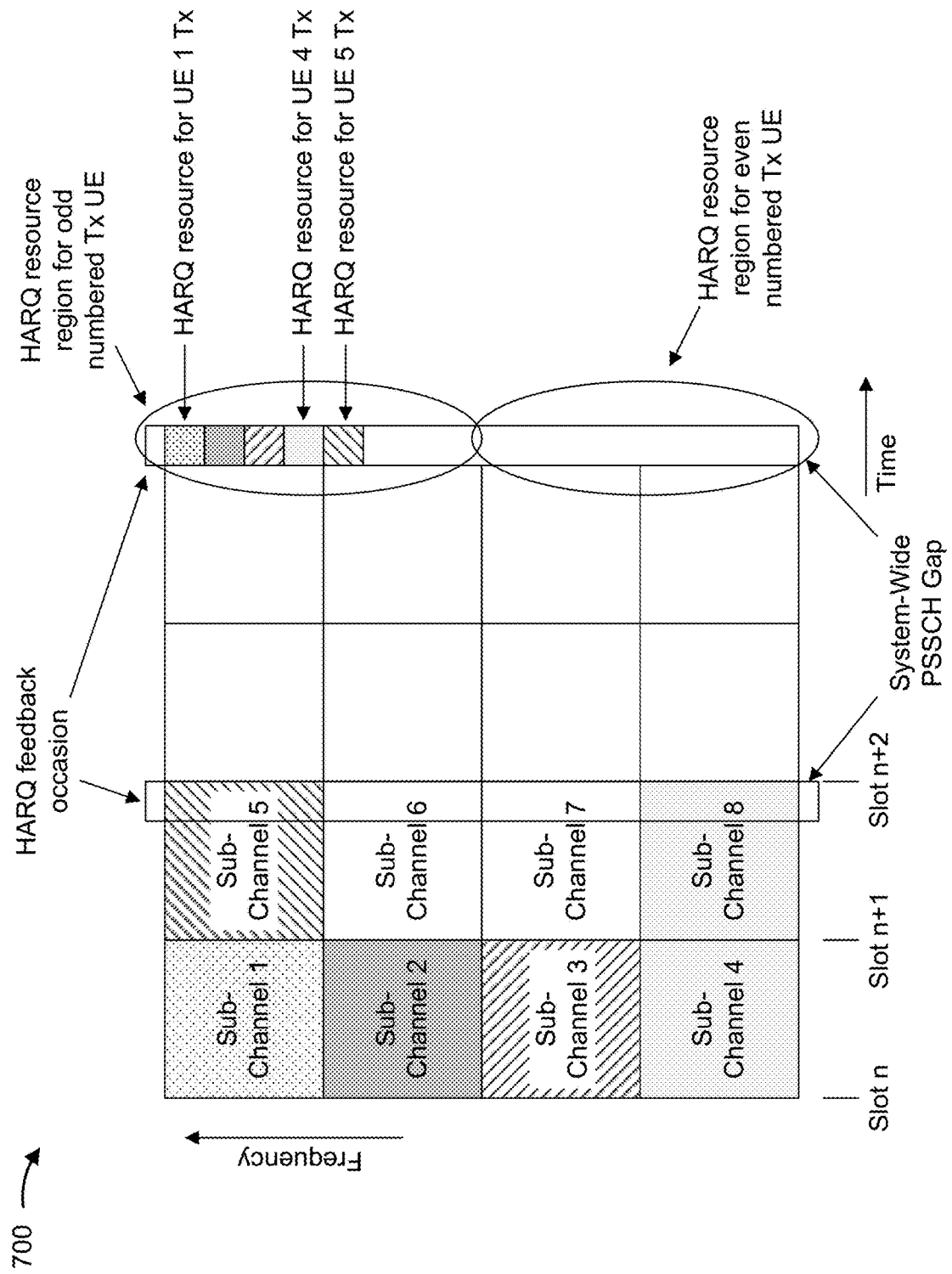
FIG. 7 is a diagram illustrating an example hybrid automatic repeat request (HARD) resource configuration for sidelink communications, in accordance with various aspects of the present disclosure.

FIG. 7 is a diagram illustrating an example HARQ resource configuration 700 for sidelink communications, in accordance with various aspects of the present disclosure.

As described above, in some circumstances, two or more subordinate entities (e.g., UEs) may communicate with each other using sidelink signals. Real-world applications of such sidelink communications may include public safety, proximity services, UE-to-network relaying, V2X communications, Internet of Everything (IoE) communications, IoT communications, mission-critical mesh, and/or various other suitable applications. Generally, a sidelink signal may refer to a signal communicated from one subordinate entity (e.g., a first UE) to another subordinate entity (e.g., a second UE) without relaying the signal through the scheduling entity (e.g., UE or BS), even though the scheduling entity may be utilized for scheduling and/or control purposes. In some aspects, the sidelink signals may be communicated using a licensed frequency spectrum, an unlicensed frequency spectrum (e.g., an industrial, scientific, and medical (ISM) radio band, such as 5 GHz, which is reserved for purposes other than cellular communication such as wireless local area network communication), and/or the like.

As shown in the example HARQ resource configuration 700 in FIG. 7, a HARQ feedback occasion may include a time-domain duration (e.g., one or more symbols) and a plurality of frequency-domain resources (e.g., a plurality of sub-channels) that are reserved for HARQ feedback on the sidelink. For example, the HARQ feedback may include an acknowledgment (ACK) to indicate that a UE successfully received a sidelink communication, a negative acknowledgement (NACK) to indicate that the UE failed to receive the sidelink communication, and/or the like. In some aspects, the frame structure of the sidelink may include a plurality of HARQ feedback occasions, and a time between the HARQ feedback occasions may define a system-wide PSSCH gap. The plurality of HARQ feedback occasions may be periodic (e.g., may occur at a particular time interval), may be configured at particular time-domain locations, and/or the like. In some aspects, a HARQ feedback occasion may be a multi-slot HARQ feedback occasion, in that the HARQ feedback occasion may be used to aggregate HARQ feedback for sidelink communications that were transmitted in a plurality of sub-channels and a plurality of slots that occurred prior to the HARQ feedback occasion.

As further shown in FIG. 7, the frequency-domain resources in each HARQ feedback occasion may be partitioned into different HARQ resource regions, each of which may include various sub-channels that correspond to HARQ resources that one or more UEs can use to transmit HARQ feedback. As an example, in FIG. 7, the frequency-domain resources in the HARQ feedback occasion may include a first HARQ resource region for odd-numbered transmitting UEs and a second HARQ resource region for even-numbered transmitting UEs (e.g., based on respective identifiers associated with the UEs). In some aspects, a UE may generally receive a HARQ configuration (e.g., from another UE, a base station in a wireless network, and/or the like) that identifies a HARQ resource to be used to transmit HARQ feedback, may be hard-coded with the HARQ configuration (e.g., the HARQ configuration may be stored on a UE prior to deployment in a wireless network), and/or the like. Accordingly, a UE may identify a HARQ resource (e.g., a sub-channel), in the HARQ feedback occasion, for transmitting HARQ feedback for a sidelink communication based at least in part on a time-domain resource (e.g., a slot) and a frequency-domain resource (e.g., a sub-channel) in which the sidelink communication was received.

Accordingly, in some cases, a UE may provide, to another UE, feedback associated with a sidelink communication transmitted by the other UE on a sidelink between the UE and the other UE. The feedback may include, for example, HARQ feedback (e.g., an ACK to indicate that the UE successfully received the sidelink communication, a NACK to indicate that the UE failed to receive the sidelink communication, and/or the like). The UE may transmit the HARQ feedback in one or more PSFCH transmissions on the sidelink. In some cases, as shown in FIG. 7, the sidelink may include a frame structure in which one or more HARQ feedback occasions may be used for transmitting the one or more PSFCH transmissions. Unlike a cellular communication link with a base station, where the UE may provide HARQ feedback to a single base station, the UE may provide HARQ feedback to multiple UEs on a sidelink in a single HARQ feedback occasion. However, if the UE is scheduled to provide a quantity of HARQ feedback that exceeds a maximum quantity that the UE can and/or is permitted to transmit in a single HARQ feedback occasion, the UE may be unable to determine which PSFCH transmissions to transmit in the HARQ feedback occasion. Furthermore, in some cases, the UE may be unable to determine how many PSFCH transmissions to transmit in the HARQ feedback occasion. For example, as a quantity of concurrent PSFCH transmissions increases, less transmit power is allocated to each PSFCH transmission (e.g., because a power budget is split among more PSFCH transmissions), there may be an additional power backoff because a transmission waveform may become a multi-cluster, additional PSFCH transmissions may increase leakage (e.g., into one or more RBs that are allocated to PSFCH transmissions for other UEs), and/or the like, which may adversely affect PSFCH reception.

Some aspects described herein relate to techniques and apparatuses for concurrent PSFCH transmission. For example, when a UE has multiple PSFCH transmissions to transmit in a given HARQ feedback occasion (e.g., based at least in part on a plurality of sidelink communications that are received from one or more other UEs on a sidelink, such as a PSSCH, a PSCCH, and/or the like), the UE may identify a subset of the PSFCH transmissions to be transmitted in a next HARQ feedback occasion using the techniques described in further detail herein. For example, in some aspects, the UE may identify various candidate sets of PSFCH transmissions that each include a quantity of PSFCH transmissions that satisfies a threshold value (e.g., is less than or equal to a maximum number of PSFCH transmissions that the UE has a capability to transmit and/or is permitted to transmit in a single HARQ feedback occasion). For each candidate set, the UE may estimate a link budget requirement for each individual PSFCH transmission and generate a bitmap indicating whether the estimated link budget requirement can be met for each individual PSFCH transmission, based at least in part on a transmit power constraint (e.g., a maximum power reduction (MPR) value, an additional MPR (A-MPR) value, and/or the like). In some aspects, the UE may assign a utility value to each bit in the bitmap and select a particular candidate set that provides a highest combined utility return. Accordingly, the UE may transmit the candidate set that provides the highest combined utility return in the next HARQ feedback occasion. In this way, the UE may provide HARQ feedback for multiple sidelink communications in a single HARQ feedback occasion in a manner that allocates appropriate transmit power to each PSFCH transmission, complies with transmit power constraints, provides a maximum return on transmission utility, and/or the like.

FIGS. 8A-8D are diagrams illustrating an example implementation 800 of concurrent PSFCH transmission, in accordance with various aspects of the present disclosure. As shown in FIGS. 8A-8D, example implementation 800 may include a plurality of UEs (e.g., UEs 120a, 120e, 505-1, 505-2, 605, 610, and/or the like) communicating over a sidelink. In the illustrated example, a particular UE receives sidelink communications from one or more other UEs and determines a set of PSFCH transmissions to be transmitted to a subset of the other UEs in a next HARQ feedback occasion. Accordingly, in the following description, the other UEs that send the sidelink communications may be referred to as "other UEs," and the particular UE that receives the sidelink communications and determines the set of PSFCH transmissions to be transmitted in the next HARQ feedback occasion may be generally referred to as "the UE." Furthermore, although the example implementation 800 illustrated in FIGS. 8A-8D includes three (3) other UEs that send sidelink communications to the UE, in some aspects, the UE may receive sidelink communications from a greater or lesser quantity of other UEs. In general, the UE and the other UEs may be included in a wireless network (e.g., wireless network 100) and may communicate via a sidelink. In some aspects, the sidelink may be configured with a frame structure, such as the frame structure 300 illustrated in FIG. 3A, a HARQ resource configuration, such as the HARQ resource configuration 700 illustrated in FIG. 7, and/or the like.

Figure 8A:
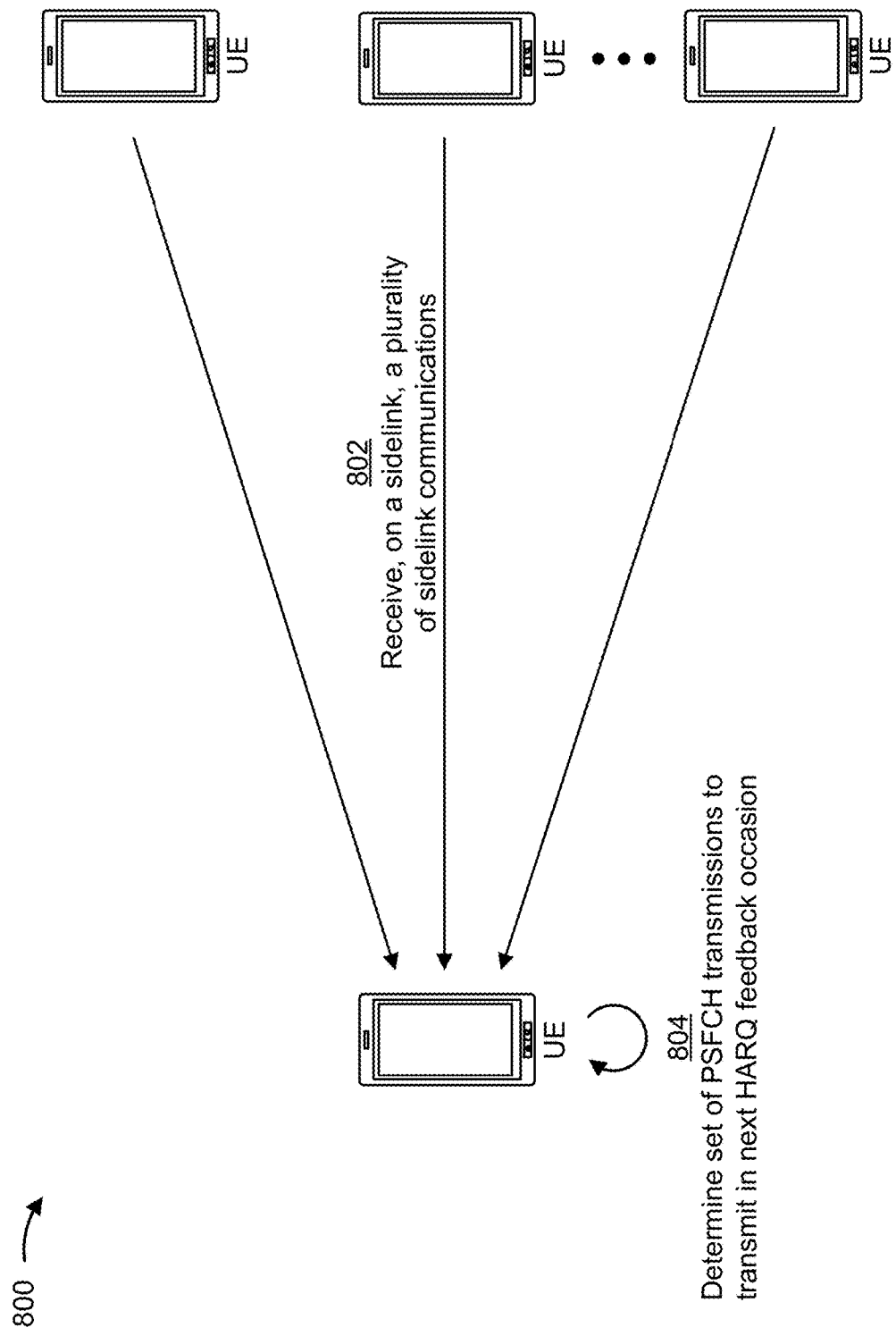
FIGS. 8A-8D are diagrams illustrating an example implementation of concurrent physical sidelink feedback channel (PSFCH) transmission, in accordance with various aspects of the present disclosure.

As shown in FIG. 8A, and by reference number 802, the UE and the other UEs may communicate via the sidelink by transmitting and/or receiving sidelink communications via the sidelink. For example, the UE may receive a plurality of sidelink communications on the sidelink from the other UEs, each of which may transmit one or more sidelink communications to the UE. In some aspects, the sidelink communications may be transmitted and received via a PSCCH, a PSSCH, a PSFCH, and/or the like. In some aspects, the plurality of sidelink communications may be transmitted on one or more channels or sub-channels of the sidelink. In this case, each sidelink communication may be transmitted in one or more time-domain resources (e.g., across one or more slots, across one or more symbols, and/or the like) and/or in one or more frequency-domain resources (e.g., in a sub-channel of the frequency bandwidth of the sidelink). In some aspects, a sub-channel may include a plurality of subcarriers of the frequency bandwidth sidelink, one or more resource blocks (RBs) of the frequency bandwidth of the sidelink, and/or the like.

As further shown in FIG. 8A, and by reference number 804, the UE may determine a set of PSFCH transmissions to be transmitted in a next HARQ feedback occasion, where each PSFCH transmission may include HARQ feedback for a sidelink communication received from another UE. For example, in some aspects, the HARQ feedback for a particular sidelink communication may include an ACK to indicate, to a transmitter of the sidelink communication (e.g., another UE), that the sidelink communication was successfully received and decoded. Additionally, or alternatively, the HARQ feedback may include a NACK to indicate, to the transmitter of the sidelink communication, that the sidelink communication was not successfully received and/or decoded. In some aspects, the UE may determine that the HARQ feedback to be included in a particular PSFCH transmission is to be an ACK if the UE is capable of decoding both control information (e.g., (SCI) included in the sidelink communication and corresponding data (e.g., a payload) of the sidelink communication. In some aspects, the UE may determine that the HARQ feedback to be included in a particular PSFCH transmission is to be a NACK if the UE fails to successfully decode the control information included in the sidelink communication and/or the corresponding data of the sidelink communication.

In some aspects, the UE and the other UEs may communicate using an ACK/NACK HARQ feedback configuration, in which a receiver UE (e.g., the UE) is to transmit an ACK based at least in part on successfully receiving and decoding a sidelink communication from a transmitter UE (e.g., another UE), and is to transmit a NACK for a sidelink communication that the receiver UE is unable to decode. In some aspects, the UE and the other UEs may communicate using a NACK-only HARQ feedback configuration, in which a receiver UE does not transmit HARQ feedback for sidelink communications that are successfully received and decoded, and only transmits a NACK for sidelink communications that the receiver UE is unable to decode.

In some aspects, the UE may be configured with a parameter that indicates a maximum quantity of PSFCH transmissions that the UE is permitted to transmit in a single HARQ feedback occasion. For example, in some aspects, the parameter that indicates the maximum quantity of PSFCH transmissions that the UE is permitted to transmit in a single HARQ feedback occasion may be configured by a base station and/or another component in the wireless network based at least in part on a concurrent transmission capability of the UE, a configured limit, congestion on a PSSCH channel, congestion on a PSCCH channel, congestion on a PSFCH channel, and/or the like. Accordingly, in some aspects, the UE may select up to the maximum quantity of PSFCH transmissions to transmit in the next HARQ feedback occasion. However, as mentioned above, in some cases transmitting additional PSFCH transmissions may create various challenges, such as less transmit power being available to allocate to each PSFCH transmission, additional power backoffs due to a waveform becoming multi-cluster, and/or the like.

Accordingly, in some aspects, the UE may determine the set of PSFCH transmissions to transmit in the next HARQ feedback occasion to maximize a utility return (e.g., a relative value or usefulness) from the PSFCH transmissions. For example, the UE may identify various candidate sets of PSFCH transmissions that each include a quantity of PSFCH transmissions that satisfies a threshold value (e.g., the maximum quantity of PSFCH transmissions that the UE is permitted to transmit in a single HARQ feedback occasion), identify certain PSFCH transmissions in each candidate set for which individual link budget requirements can be satisfied based at least in part on a transmit power constraint, and select a particular candidate set to be transmitted in the next HARQ feedback occasion by applying a utility function to the individual PSFCH transmissions in each candidate set.

Figure 8B:
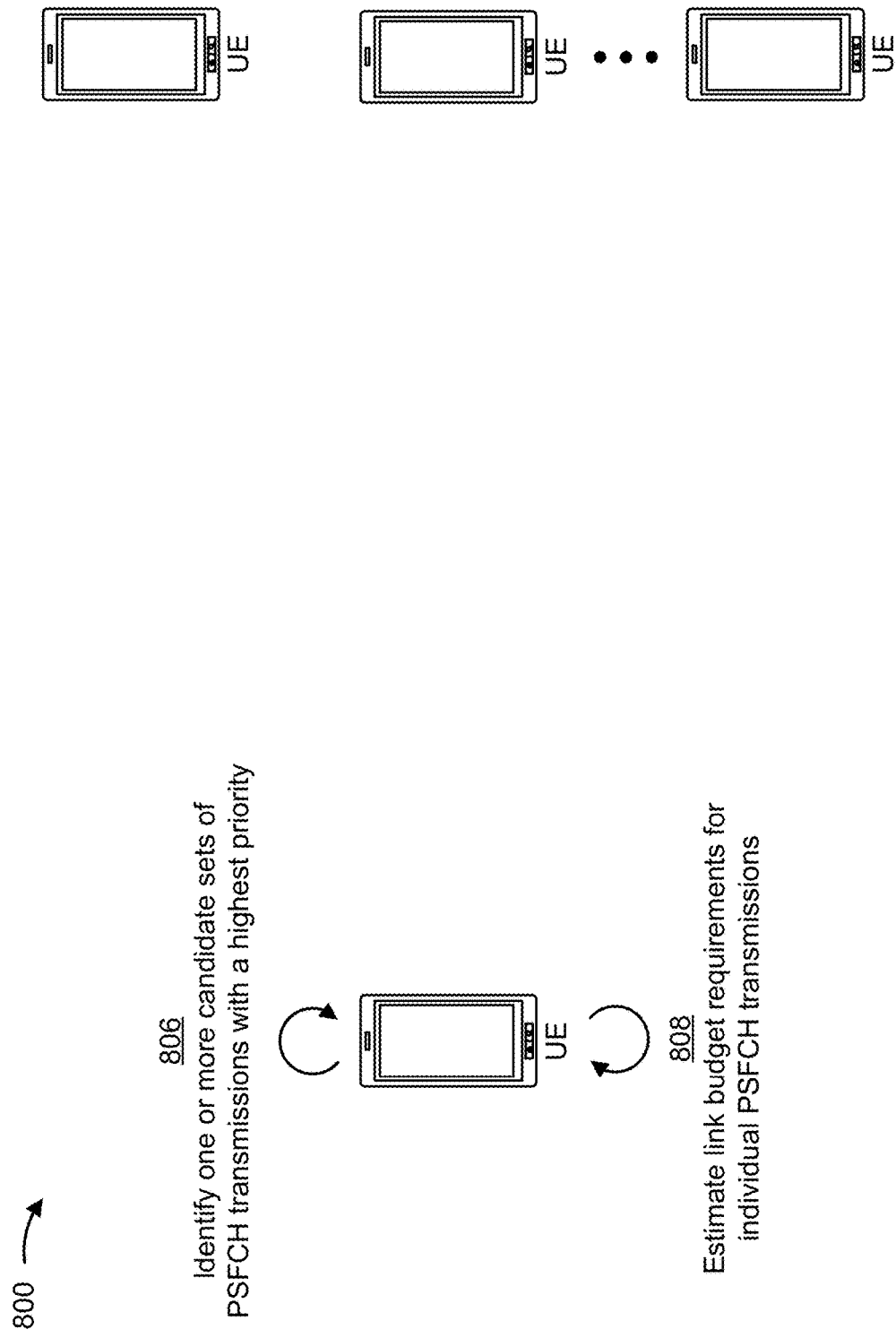

As shown in FIG. 8B, and by reference number 806, the UE may identify one or more candidate sets of PSFCH transmissions with a highest priority. For example, a parameter (M) may represent the maximum quantity of concurrent PSFCH transmissions, and the UE may identify candidate sets of n PSFCH transmissions with a highest priority for each n≤M (e.g., if the maximum quantity of concurrent PSFCH transmissions is five (5), the UE may identify one or more candidate sets that include one (1) PSFCH transmission with a highest priority, one or more candidate sets that include two (2) PSFCH transmissions with a highest priority, and/or the like). In some aspects, the UE may identify the PSFCH transmissions with the highest priority using various techniques. For example, the UE may determine that a first sidelink communication has a higher priority than a second sidelink communication, and may include the PSFCH transmission with the HARQ feedback for the first sidelink communication in the one or more candidate sets. As another example, a priority may be determined for each PSFCH transmission that includes HARQ feedback, and the UE may populate the one or more candidate sets starting with PSFCH transmissions that have the highest priority and continuing with PSFCH transmissions that have a gradually decreasing priority until the one or more candidate sets have been populated with n PSFCH transmissions. As another example, a priority threshold may be defined, whereby the candidate sets may only include PSFCH transmissions having a priority that satisfies the priority threshold.

In some aspects, the UE may determine the priority for a particular PSFCH transmission using various techniques. For example, in some aspects, the priority may depend on whether the PSFCH transmission includes an ACK or a NACK, with a unicast, multicast, and/or groupcast NACK having a higher priority than a unicast, multicast, and/or groupcast ACK (e.g., because a sidelink communication that is unsuccessfully received may not be retransmitted if a NACK is not sent, whereas the worst case scenario from not sending an ACK is that a successfully received sidelink communication will be retransmitted). In another example, the priority for a particular PSFCH transmission may be based at least in part on SCI associated with the sidelink communication. For example, the SCI may be included in a control portion associated with the data portion of the sidelink communication, and the SCI may include a field or value that indicates or specifies the priority of the sidelink communication. In other examples, the priority for a particular PSFCH transmission may be based at least in part on a distance between the UE and the (other) UE that transmitted the sidelink communication (e.g., prioritizing PSFCH transmissions for other UEs that are located closer to the UE to ensure that data sent from nearby transmitters is successfully decoded, prioritizing PSFCH transmissions for other UEs that are located farther from the UE to provide the transmitter with feedback roughly indicating a transmission range for the sidelink communication), signal measurements such as RSRP, RSSI, RSRP, CQI, and/or the like (e.g., prioritizing PSFCH transmissions with a larger RSRP, as a larger RSRP measurement may indicate that the other UE is closer to the UE), a frequency location to be used for the PSFCH transmission (e.g., as indicated by a time and/or frequency location of a data channel), a transmission mode associated with the sidelink communication (e.g., with a unicast transmission mode having a greater priority than a groupcast transmission mode, and the groupcast transmission mode having a higher priority than a broadcast transmission mode), and/or the like.

As further shown in FIG. 8B, and by reference number 808, the UE may estimate link budget requirements for individual PSFCH transmissions in each of the one or more candidate sets of PSFCH transmissions. In some aspects, the link budget requirements for the individual PSFCH transmissions may be estimated based at least in part on propagation characteristics between the UE and the other UEs. For example, the propagation characteristics may include a path loss, shadowing, antenna gain, and/or the like, which may generally be reciprocal between the UE and the other UEs (e.g., if there are certain obstacles, reflectors, and/or the like in a path between the UE and the other UEs, the propagation characteristics may be reciprocal in both directions). Accordingly, because the propagation characteristics between the UE and the other UEs are reciprocal, the UE may estimate an attenuation for a PSFCH transmission to be sent to a particular other UE based on estimated attenuation associated with the sidelink communication received from the particular other UE via a PSSCH or PSCCH.

Accordingly, to estimate the link budget requirement for a particular PSFCH transmission, the UE may estimate the attenuation associated with the corresponding sidelink communication received via a PSSCH or PSCCH. In some aspects, the attenuation may be represented by the difference between an original transmission power ($P_0$) associated with the corresponding sidelink communication and an RSRP measurement associated with the corresponding sidelink communication. For example, in some aspects, the original transmission power ($P_0$) may be a fixed value that is signaled to the UE, indicated in SCI, and/or the like, and the RSRP measurement may be obtained by measuring a power level at which the sidelink communication is received via the PSSCH or PSCCH. Accordingly, a strong RSRP measurement may generally indicate a strong link, a small distance between the UE and the other UE, and/or the like, in which case the PSFCH transmission that includes HARQ feedback for the sidelink communication may have a relatively low link budget requirement. In another example, a weak RSRP measurement may generally indicate a weak link, a large distance between the UE and the other UE, and/or the like, in which case the PSFCH transmission that includes HARQ feedback for the sidelink communication may have a relatively high link budget requirement. In some aspects, the UE may determine the RSRP measurement (and thus the link budget requirement) for a PSFCH transmission to be sent to a particular other UE based on the corresponding sidelink communication, or the UE may determine an average RSRP for multiple sidelink communications received from the particular other UE over a given time period in order to obtain a more accurate RSRP measurement.

In some aspects, based at least in part on the attenuation associated with a sidelink communication received from a particular other UE, the UE may estimate the link budget requirement for the PSFCH transmission as follows:

$$P_1 - (P_0 - RSRP) - N \geq SNR$$

where $P_1$ represents a transmit power available to be allocated to the individual PSFCH transmission to the other UE, the expression ($P_0$-RSRP) represents the attenuation associated with the sidelink communication received from the other UE and therefore the attenuation of the PSFCH transmission to the other UE based at least in part on the reciprocal propagation characteristics, N represents noise (e.g., thermal noise) that the UE can measure within a transmission bandwidth for the PSFCH transmission, and SNR is a minimum SNR (signal-to-noise ratio) for the other UE to be able to reliably decode the PSFCH transmission (e.g., a higher SNR than an SNR for detecting the PSFCH transmission).

In some aspects, the UE may determine a value for $P_1$, representing the transmit power available to be allocated to an individual PSFCH transmission to a particular other UE, based on one or more transmit power constraints. In some aspects, the one or more transmit power constraints may generally include a maximum transmit power capability of the UE (e.g., a maximum output power), one or more parameters that relate to a power backoff, one or more power sharing rules to be applied to concurrent PSFCH transmissions, and/or the like. For example, the one or more parameters that relate to the power backoff may include a maximum power reduction (MPR) value by which the maximum transmit power capability of the UE is to be reduced (e.g., to control adjacent channel leakage). In some aspects, the parameters that relate to the power backoff may further include an additional MPR (A-MPR) value that is added to the MPR value to provide additional spectral emission control (e.g., the A-MPR value specifies a further amount by which the maximum transmit power capability of the UE is to be reduced due to regulatory, deployment, or other constraints). Accordingly, based on the maximum transmit power capability of the UE and the one or more parameters that relate to the power backoff (e.g., MPR, A-MPR, and/or the like), the UE may determine a maximum transmit power that is available to allocate among a quantity of n concurrent PSFCH transmissions in a particular candidate set.

In some aspects, the UE may apply one or more power sharing rules to determine an allocation of the maximum available transmit power among the n PSFCH transmissions in a particular candidate set. For example, in some aspects, the UE may equally divide the maximum available transmit power among the n PSFCH transmissions in a particular candidate set, in which case the transmit power available to allocate to an individual PSFCH transmission ($P_1$) may be the maximum available transmit power divided by n. Additionally, or alternatively, in some aspects, all RBs may have an equal power spectrum density, in which case the maximum available transmit power may be divided among a quantity of RBs in which the n PSFCH transmissions are to be sent, and power allocated to a particular RB is divided among PSFCH transmissions allocated to the particular RB (e.g., equally, according to priority, according to an estimated link budget requirement, and/or the like). Additionally, or alternatively, in some aspects, a value for $P_1$ that satisfies the link budget requirement may be determined for each individual PSFCH transmission, and power may be allocated to each individual PSFCH transmission in a candidate set according to a descending priority until a total power budget has been exhausted.

Figure 8C:
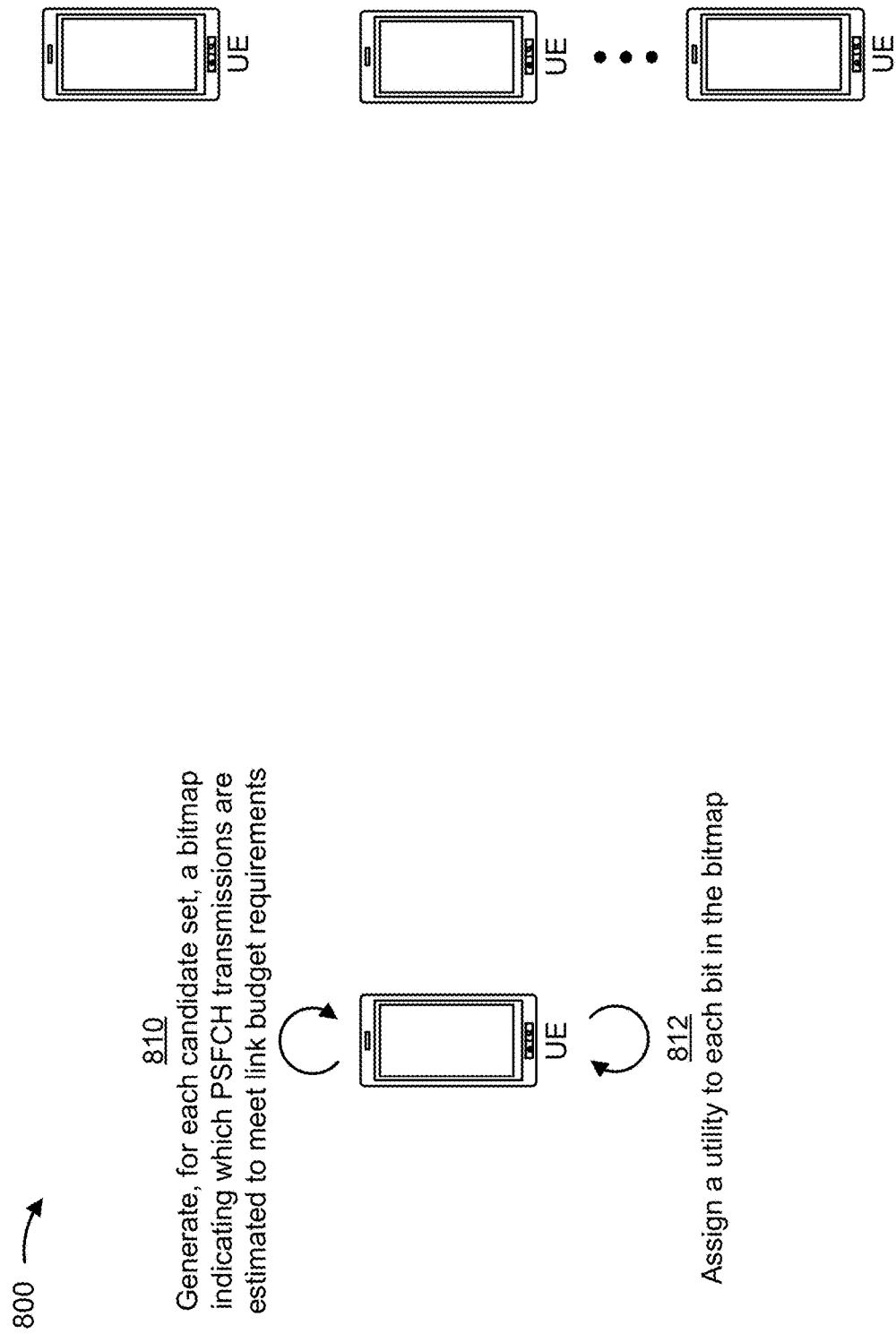

As shown in FIG. 8C, and by reference number 810, the UE may generate, for each candidate set, a bitmap indicating which PSFCH transmissions are estimated to meet link budget requirements. For example, as described above, the UE may estimate link budget requirements for each individual PSFCH transmission (e.g., based on an original transmit power for a sidelink communication, an RSRP measurement associated with the sidelink communication, noise in a PSFCH transmission bandwidth, a minimum SNR to decode the PSFCH transmission, and/or the like). Furthermore, as described above, the UE may determine a transmit power that is available to be allocated to each individual PSFCH transmission (e.g., based on a maximum transmit power capability, an MPR value and/or A-MPR value, one or more power sharing rules, and/or the like). Accordingly, in some aspects, the UE may determine whether the estimated link budget requirement can be met for each individual PSFCH transmission in a candidate set (e.g., based on whether $P_1-(P_0-RSRP)-N \geq SNR$), and the UE may generate a bitmap for each candidate set that indicates whether the estimated link budget can be satisfied for each individual PSFCH transmission. For example, in some aspects, a bit corresponding to an individual PSFCH transmission may be set to a first value (e.g., zero (0)) to indicate that the estimated link budget cannot be satisfied for the PSFCH transmission, or to a second value (e.g., one (1)) to indicate that the estimated link budget can be satisfied.

As further shown in FIG. 8C, and by reference number 812, the UE may assign a utility to each bit in the bitmap generated for each of the one or more candidate sets. For example, for a particular bit that has been set to the first value (e.g., zero) to indicate that the estimated link budget for the corresponding PSFCH transmission cannot be satisfied, the utility assigned to the bit may have a negative value based at least in part on a potential of the PSFCH to create harmful interference to other PSFCH transmissions (e.g., due to in-band emission (IBE) and/or intermodulation distortion (IMD) leakage, raised noise at another UE intended to receive the PSFCH transmission, and/or the like). Alternatively, in some aspects, the bit may be assigned a small positive value (e.g., a positive value that satisfies a threshold) where the PSFCH transmission is associated with a multicast configuration (e.g., where PSFCH transmissions from multiple UEs are combined at the other UE intended to receive the PSFCH transmission such that the PSFCH transmission can be decoded even if the individual PSFCH transmission cannot be successfully decoded standing alone). Alternatively, the bit may be assigned a zero value or a null value in cases where the PSFCH transmission serves no utility (e.g., does not create harmful interference, does not have the potential to be combined with other PSFCH transmissions in a multicast configuration, and/or the like).

In some aspects, for a particular bit that has been set to the second value (e.g., one) to indicate that the estimated link budget for the corresponding PSFCH transmission can be satisfied, the utility assigned to the bit may have a positive value that is generally greater than the small positive value that can be assigned to bits corresponding to PSFCH transmissions for which the estimated link budget cannot be satisfied. For example, in some aspects, the positive value assigned to a particular bit associated with a PSFCH transmission having an estimated link budget that can be satisfied may be based at least in part on a priority associated with the PSFCH transmission (e.g., a bit associated with a high priority PSFCH transmission may be assigned a relatively higher utility value), a distance between the UE and the other UE intended to receive the PSFCH transmission (e.g., a PSFCH transmission intended for another UE located close to the UE may be assigned a relatively higher utility value), an RSRP measurement between the UE and the other UE intended to receive the PSFCH transmission (e.g., a PSFCH transmission intended for another UE with a strong RSRP measurement may be assigned a relatively higher utility value), a remaining delay budget associated with a corresponding sidelink communication (e.g., a PSFCH transmission to indicate a NACK for a delay-sensitive packet may be assigned a relatively higher utility value to ensure that the delay-sensitive packet is retransmitted before the remaining delay budget is exhausted), a current packet reception rate or a bit rate on a link between the UE and the other UE intended to receive the PSFCH transmission (e.g., relatively higher utility values may be assigned to a bit associated with a PSFCH transmission related to a PSSCH, a PSCCH, or another suitable link that has a high packet fail rate or a low bit rate), and/or the like.

Figure 8D:
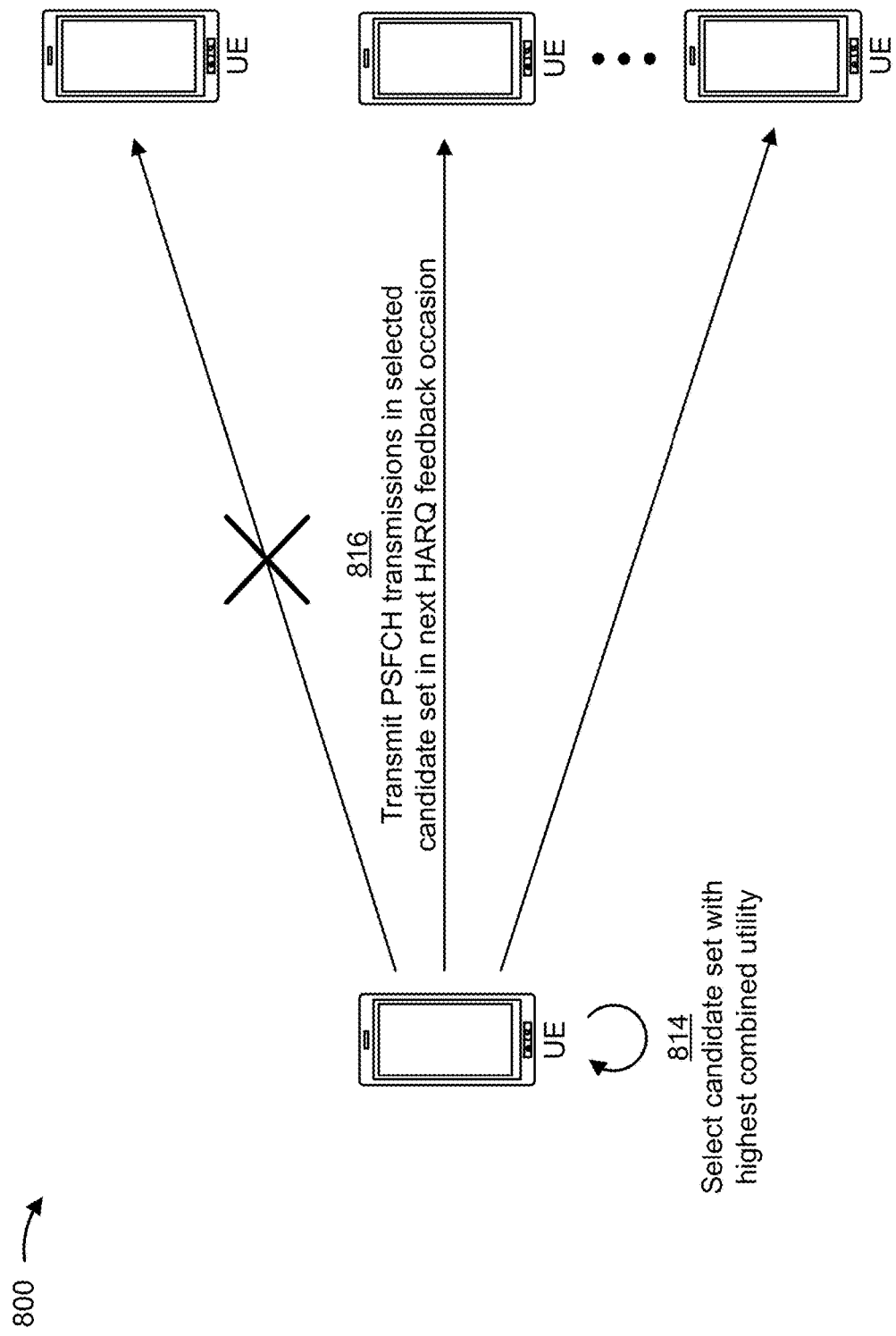

As shown in FIG. 8D, and by reference number 814, the UE may select a particular candidate set that has a highest combined utility. For example, in some aspects, a utility return for a particular candidate set may be determined based at least in part on a combination of the utility values assigned to each bit in the bitmap that corresponds to the particular candidate set. For example, the utility return for a particular candidate set may correspond to a sum of the utility values assigned to each bit in the bitmap that corresponds to the particular candidate set, a squared sum of the utility values assigned to each bit in the bitmap that corresponds to the particular candidate set, and/or the like. In the latter case, when determining the squared sum of the utility values, a sign (e.g., positive or negative) associated with the utility value may be preserved. For example, after a negative utility value is squared, the squared value may be multiplied by negative one or another suitable expression (e.g., $$\frac{\sqrt{u^2}}{u},$$

where u is the negative utility value) to preserve the negative sign of the original utility value.

As shown in FIG. 8D, and by reference number 816, the UE may transmit PSFCH transmissions that are included in the selected candidate set to the appropriate other UEs in the next HARQ feedback occasion. For example, the PSFCH transmissions may be transmitted over a PSFCH in one or more RBs that are allocated to the PSFCH transmissions. Furthermore, in some aspects, the PSFCH transmissions may be transmitted according to the one or more power sharing rules described in further detail above. For example, a total transmit power that is available to use in the HARQ feedback occasion (e.g., subject to a transmit power constraint, such as an MPR value, an A-MPR value, and/or the like) may be equally divided among the PSFCH transmissions that are included in the selected candidate set. Additionally, or alternatively, the total transmit power available to use in the HARQ feedback occasion may be equally divided among a set of RBs that are allocated to the PSFCH transmissions, and in some cases, a portion of the total transmit power allocated to a particular RB may be divided among multiple PSFCH transmissions that share the RB (e.g., the portion of the total transmit power allocated to the particular RB may be divided equally among the PSFCH transmissions that share the RB, divided according to priority such as allocating more transmit power to higher priority PSFCH transmissions, divided according to an estimated link budget requirement, and/or the like). Additionally, or alternatively, available transmit power may be allocated to individual PSFCH transmissions in the selected candidate set according to a descending priority until a total power budget has been exhausted.

As indicated above, FIGS. 8A-8D are provided as an example. Other examples may differ from what is described with respect to FIG. 8A-8D.

FIG. 9 is a diagram illustrating an example process 900 performed, for example, by a UE, in accordance with various aspects of the present disclosure. Example process 900 is an example where a UE (e.g., UE 120, UE 505, Tx/Rx UE 605, Rx/Tx UE 610, and/or the like) performs operations associated with concurrent PSFCH transmission.

As shown in FIG. 9, in some aspects, process 900 may include identifying multiple candidate sets of PSFCH transmissions, wherein the multiple candidate sets each include a plurality of PSFCH transmissions to provide HARQ feedback for a plurality of sidelink communications received from one or more other UEs (block 910). For example, the UE (e.g., using controller/processor 280, memory 282, and/or the like) may identify multiple candidate sets of PSFCH transmissions, as described above. In some aspects, the multiple candidate sets each include a plurality of PSFCH transmissions to provide HARQ feedback for a plurality of sidelink communications received from one or more other UEs.

As further shown in FIG. 9, in some aspects, process 900 may include identifying, from the multiple candidate sets, one or more candidate sets that satisfy a PSFCH transmit power constraint based at least in part on a total transmission power for the plurality of PSFCH transmissions included in the one or more candidate sets (block 920). For example, the UE (e.g., using controller/processor 280, memory 282, and/or the like) may identify, from the multiple candidate sets, one or more candidate sets that satisfy a PSFCH transmit power constraint based at least in part on a total transmission power for the plurality of PSFCH transmissions included in the one or more candidate sets, as described above.

As further shown in FIG. 9, in some aspects, process 900 may include selecting, from the one or more candidate sets that satisfy the PSFCH transmit power constraint, at least one candidate set that has a highest value for a utility parameter among utility parameters associated with each of the one or more candidate sets (block 930). For example, the UE (e.g., using controller/processor 280, memory 282, and/or the like) may select, from the one or more candidate sets that satisfy the PSFCH transmit power constraint, at least one candidate set that has a highest value for a utility parameter among utility parameters associated with each of the one or more candidate sets, as described above.

As further shown in FIG. 9, in some aspects, process 900 may include transmitting, on a PSFCH, the plurality of PSFCH transmissions included in the at least one candidate set in a HARQ feedback occasion (block 940). For example, the UE (e.g., using controller/processor 280, transmit processor 264, TX MIMO processor 266, MOD 254, antenna 252, and/or the like) may transmit, on a PSFCH, the plurality of PSFCH transmissions included in the at least one candidate set in a HARQ feedback occasion, as described above.

Process 900 may include additional aspects, such as any single aspect or any combination of aspects described below and/or in connection with one or more other processes described elsewhere herein.

In a first aspect, the multiple candidate sets of PSFCH transmissions are identified based at least in part on one or more rules assigning priorities to the HARQ feedback for the plurality of sidelink communications.

In a second aspect, alone or in combination with the first aspect, the one or more rules assign HARQ feedback that includes a negative acknowledgment a higher priority than HARQ feedback that includes an acknowledgment.

In a third aspect, alone or in combination with one or more of the first and second aspects, a quantity of the PSFCH transmissions included in each of the multiple candidate sets satisfies a threshold value.

In a fourth aspect, alone or in combination with one or more of the first through third aspects, the threshold value is based at least in part on one or more of a capability associated with the UE, a configured value, or congestion on one or more of the PSFCH, a PSSCH, or a PSCCH.

In a fifth aspect, alone or in combination with one or more of the first through fourth aspects, the at least one candidate set that has the highest value for the utility parameter is randomly selected from at least two candidate sets for which respective utility parameters are equal in value.

In a sixth aspect, alone or in combination with one or more of the first through fifth aspects, the one or more candidate sets that satisfy the PSFCH transmit power constraint are identified based at least in part on respective link budget requirements for individual PSFCH transmissions in each of the multiple candidate sets.

In a seventh aspect, alone or in combination with one or more of the first through sixth aspects, the plurality of sidelink communications are received from the one or more other UEs over one or more of a PSSCH or a PSCCH, and the link budget requirements for the individual PSFCH transmissions are based at least in part on an RSRP measurement associated with one or more of the PSSCH or the PSCCH.

In an eighth aspect, alone or in combination with one or more of the first through seventh aspects, the link budget requirement for an individual PSFCH transmission decreases as a corresponding RSRP measurement increases.

In a ninth aspect, alone or in combination with one or more of the first through eighth aspects, the link budget requirement for at least one individual PSFCH transmission is based at least in part on an average RSRP measurement for multiple sidelink communications from a particular UE.

In a tenth aspect, alone or in combination with one or more of the first through ninth aspects, process 900 further includes determining the link budget requirement for an individual PSFCH transmission based at least in part on a transmit power allocated to the individual PSFCH transmission, an attenuation associated with one of the plurality of sidelink communications corresponding to the individual PSFCH transmission, a noise within a transmission bandwidth associated with the individual PSFCH transmission, and a signal-to-noise ratio to decode the individual PSFCH transmission.

In an eleventh aspect, alone or in combination with one or more of the first through tenth aspects, the attenuation associated with the sidelink communication corresponding to the individual PSFCH transmission is based at least in part on an original transmission power associated with the sidelink communication and an RSRP measurement associated with the sidelink communication.

In a twelfth aspect, alone or in combination with one or more of the first through eleventh aspects, the PSFCH transmit power constraint is a power backoff based at least in part on one or more of an MPR value or an A-MPR value to be added to the MPR value.

In a thirteenth aspect, alone or in combination with one or more of the first through twelfth aspects, process 900 further includes determining a total available transmit power to use in the HARQ feedback occasion based at least in part on the power backoff, and determining that the one or more candidate sets satisfy the PSFCH transmit power constraint based at least in part on the total available transmit power to use in the HARQ feedback occasion equaling or exceeding a sum of transmission powers allocated to the plurality of PSFCH transmissions included in the one or more candidate sets.

In a fourteenth aspect, alone or in combination with one or more of the first through thirteenth aspects, process 900 further includes applying one or more power sharing rules to allocate the total available transmit power to use in the HARQ feedback occasion among the plurality of PSFCH transmissions that are transmitted in the HARQ feedback occasion.

In a fifteenth aspect, alone or in combination with one or more of the first through fourteenth aspects, the one or more power sharing rules include equally dividing the total available transmit power among the plurality of PSFCH transmissions transmitted in the HARQ feedback occasion.

In a sixteenth aspect, alone or in combination with one or more of the first through fifteenth aspects, the one or more power sharing rules include equally dividing the total available transmit power among a subset of RBs used to transmit the plurality of PSFCH transmissions in the HARQ feedback occasion, and further equally dividing a portion of the total available transmit power allocated to a particular RB among a portion of the plurality of PSFCH transmissions that share the particular RB.

In a seventeenth aspect, alone or in combination with one or more of the first through sixteenth aspects, the one or more power sharing rules include equally dividing the total available transmit power among a subset of RBs used to transmit the plurality of PSFCH transmissions in the HARQ feedback occasion, and further dividing a portion of the total available transmit power allocated to a particular RB among a portion of the plurality of PSFCH transmissions that share the particular RB based at least in part on one or more of a priority or an estimated link budget requirement associated with the portion of the PSFCH transmissions that share the particular RB.

In a eighteenth aspect, alone or in combination with one or more of the first through seventeenth aspects, the one or more power sharing rules include allocating the total available transmit power to the plurality of PSFCH transmissions transmitted in the HARQ feedback occasion based at least in part on respective link budget requirements for each individual PSFCH transmission according to a descending priority until the total available transmit power is exhausted.

In an nineteenth aspect, alone or in combination with one or more of the first through eighteenth aspects, process 900 further includes generating, for each of the one or more candidate sets that satisfy the PSFCH transmit power constraint, a bitmap in which each individual bit corresponds to an individual PSFCH transmission, and assigning a utility value to each individual bit in the bitmap, where the respective utility parameters associated with the one or more candidate sets are based at least in part on a combination of the utility values assigned to the individual bits in the bitmaps associated with each respective candidate set.

In a twentieth aspect, alone or in combination with one or more of the first through nineteenth aspects, each individual bit is set to a first value if a link budget requirement for the corresponding individual PSFCH transmission is satisfied or to a second value if a link budget requirement for a corresponding individual PSFCH transmission is not satisfied.

In a twenty-first aspect, alone or in combination with one or more of the first through twentieth aspects, the utility value assigned to each individual bit set to the first value is based at least in part on one or more of a priority associated with the corresponding individual PSFCH transmission, a distance between the UE and a receiver of the corresponding individual PSFCH transmission, an RSRP between the UE and the receiver of the corresponding individual PSFCH transmission, a remaining delay budget for one of the plurality of sidelink communications associated with the corresponding individual PSFCH transmission, a packet reception rate associated with sidelink communications between the UE and the receiver of the corresponding individual PSFCH transmission, or a bit rate associated with the sidelink communications between the UE and the receiver of the corresponding individual PSFCH transmission.

In a twenty-second aspect, alone or in combination with one or more of the first through twenty-first aspects, the utility value assigned to each individual bit set to the second value is based at least in part on one or more of a potential of a corresponding individual PSFCH transmission creating harmful interference to other PSFCH transmissions, or a multicast configuration associated with the corresponding individual PSFCH transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
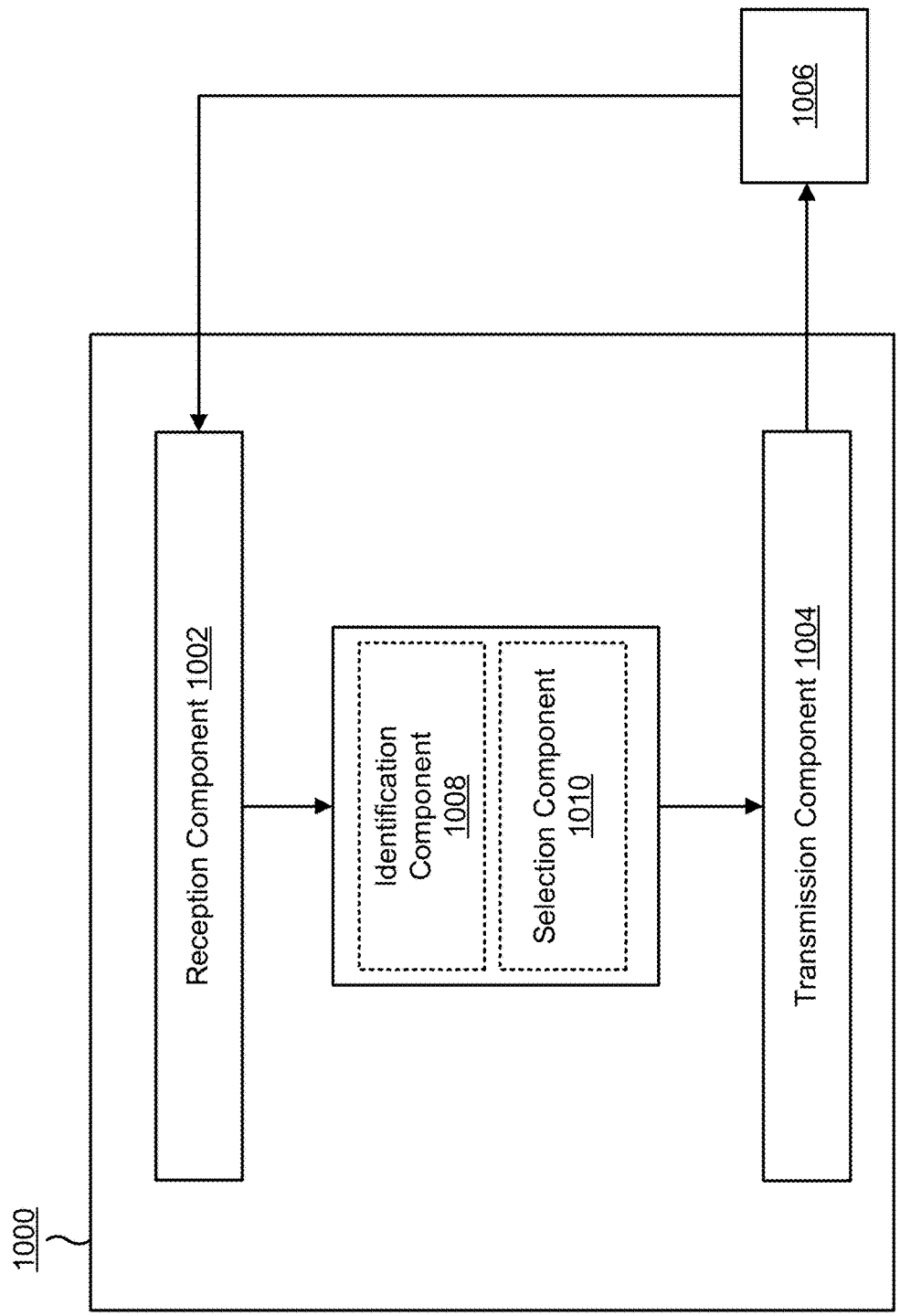
FIG. 10 is a block diagram of an example apparatus for wireless communication, in accordance with various aspects of the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of an identification component 1008 or a selection component 1010, among other examples.

In some aspects, the apparatus 1000 may be configured to perform one or more operations described herein in connection with FIGS. 8A-8D. Additionally or alternatively, the apparatus 1000 may be configured to perform one or more processes described herein, such as process 900 of FIG. 9. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The identification component 1008 may identify multiple candidate sets of PSFCH transmissions, wherein the multiple candidate sets each include a plurality of PSFCH transmissions to provide HARQ feedback for a plurality of sidelink communications received from one or more other UEs. In some aspects, the identification component 1008 may include a controller/processor, a memory, or a combination thereof, of the UE described above in connection with FIG. 2. The identification component 1008 may identify, from the multiple candidate sets, one or more candidate sets that satisfy a PSFCH transmit power constraint based at least in part on a total transmission power for the plurality of PSFCH transmissions included in the one or more candidate sets. The selection component 1010 may select, from the one or more candidate sets that satisfy the PSFCH transmit power constraint, at least one candidate set that has a highest value for a utility parameter among utility parameters associated with each of the one or more candidate sets. In some aspects, the selection component 1010 may include a controller/processor, a memory, or a combination thereof, of the UE described above in connection with FIG. 2. The transmission component 1004 may transmit, on a PSFCH, the plurality of PSFCH transmissions included in the at least one candidate set in a HARQ feedback occasion.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
identify one or more candidate sets of physical sidelink feedback channel (PSFCH) transmissions that each include a quantity of PSFCH transmissions, wherein the PSFCH transmissions are to provide hybrid automatic repeat request (HARQ) feedback for a plurality of sidelink communications received from one or more other UEs, and wherein the quantity of PSFCH transmissions included in each of the one or more candidate sets are identified in accordance with a concurrent transmission capability of the UE;
identify, based at least in part on link budget requirements for each PSFCH transmission of the quantity of the PSFCH transmissions, one or more numbers of the PSFCH transmissions, of the quantity of the PSFCH transmissions, included in each candidate set, wherein the one or more numbers of the PSFCH transmissions are identified in accordance with a transmit power constraint;
select at least one candidate set that includes the one or more numbers of the PSFCH transmissions from the one or more candidate sets based at least in part on a priority associated with each PSFCH transmission of the quantity of the PSFCH transmissions in the at least one candidate set; and
transmit the at least one candidate set in a HARQ feedback occasion.

2. The UE of claim 1, wherein the one or more numbers are identified further based at least in part on one or more rules.

3. The UE of claim 2, wherein the one or more rules assign priorities to the HARQ feedback for the plurality of sidelink communications.

4. The UE of claim 1, wherein the transmit power constraint is a power backoff.

5. The UE of claim 1, wherein the transmit power constraint is based at least in part on a maximum power reduction (MPR) value.

6. The UE of claim 1, wherein the one or more numbers is more than one number for the PSFCH transmissions.

7. The UE of claim 1, wherein a highest number of the one or more numbers is equal to or less than a maximum quantity of concurrent PSFCH transmissions.

8. The UE of claim 1, wherein the at least one candidate set includes the one or more of the PSFCH transmissions.

9. The UE of claim 1, wherein the one or more of the PSFCH transmissions include multiple PSFCH transmissions.

10. A method of wireless communication performed by a user equipment (UE), comprising:
identifying one or more candidate sets of physical sidelink feedback channel (PSFCH) transmissions that each include a quantity of PSFCH transmissions, wherein the PSFCH transmissions are to provide hybrid automatic repeat request (HARQ) feedback for a plurality of sidelink communications received from one or more other UEs, and wherein the quantity of PSFCH transmissions included in each of the one or more candidate sets are identified in accordance with a concurrent transmission capability of the UE;
identifying, based at least in part on link budget requirements for each PSFCH transmission of the quantity of the PSFCH transmissions, one or more numbers of the PSFCH transmissions, of the quantity of the PSFCH transmissions included in each candidate set, wherein the one or more numbers of the PSFCH transmissions are identified in accordance with a transmit power constraint;
selecting at least one candidate set that includes the one or more numbers of the PSFCH transmissions from the one or more candidate sets based at least in part on a priority associated with each PSFCH transmission of the quantity of the PSFCH transmissions in the at least one candidate set; and
transmitting the at least one candidate set in a HARQ feedback occasion.

11. The method of claim 10, wherein the one or more numbers are identified further based at least in part on one or more rules.

12. The method of claim 11, wherein the one or more rules assign priorities to the HARQ feedback for the plurality of sidelink communications.

13. The method of claim 10, wherein the transmit power constraint is a power backoff.

14. The method of claim 10, wherein the transmit power constraint is based at least in part on a maximum power reduction (MPR) value.

15. The method of claim 10, wherein the one or more numbers is more than one number for the PSFCH transmissions.

16. The method of claim 10, wherein a highest number of the one or more numbers is equal to or less than a maximum quantity of concurrent PSFCH transmissions.

17. The method of claim 10, wherein the at least one candidate set includes the one or more of the PSFCH transmissions.

18. The method of claim 10, wherein the one or more of the PSFCH transmissions include multiple PSFCH transmissions.

19. A non-transitory computer-readable medium storing a set of instructions for wireless communication, the set of instructions comprising:
one or more instructions that, when executed by one or more processors of a user equipment (UE), cause the UE to:
identify one or more candidate sets of physical sidelink feedback channel (PSFCH) transmissions that each include a quantity of PSFCH transmissions, wherein the PSFCH transmissions are to provide hybrid automatic repeat request (HARQ) feedback for a plurality of sidelink communications received from one or more other UEs, and wherein the quantity of PSFCH transmissions included in each of the one or more candidate sets are identified in accordance with a concurrent transmission capability of the UE;
identify, based at least in part on link budget requirements for each PSFCH transmission of the quantity of the PSFCH transmissions, one or more numbers of the PSFCH transmissions, of the quantity of the PSFCH transmissions included in each candidate set, wherein the one or more numbers of the PSFCH transmissions are identified in accordance with a transmit power constraint;

select at least one candidate set that includes the one or more numbers of the PSFCH transmissions from the one or more candidate sets based at least in part on a priority associated with each PSFCH transmission of the quantity of the PSFCH transmissions in the at least one candidate set; and transmit the at least one candidate set in a HARQ feedback occasion.

20. The non-transitory computer-readable medium of claim 19, wherein the one or more numbers are identified further based at least in part on one or more rules.

21. The non-transitory computer-readable medium of claim 20, wherein the one or more rules assign priorities to the HARQ feedback for the plurality of sidelink communications.

22. The non-transitory computer-readable medium of claim 19, wherein the transmit power constraint is a power backoff.

23. The non-transitory computer-readable medium of claim 19, wherein the transmit power constraint is based at least in part on a maximum power reduction (MPR) value.

24. The non-transitory computer-readable medium of claim 19, wherein the one or more numbers is more than one number for the PSFCH transmissions.

25. The non-transitory computer-readable medium of claim 19, wherein the at least one candidate set includes the one or more of the PSFCH transmissions.

26. An apparatus for wireless communication, comprising:

means for identifying one or more candidate sets of physical sidelink feedback channel (PSFCH) transmissions that each include a quantity of PSFCH transmissions, wherein the PSFCH transmissions are to provide hybrid automatic repeat request (HARQ) feedback for a plurality of sidelink communications received from one or more other apparatuses, and wherein the quantity of PSFCH transmissions included in each of the one or more candidate sets are identified in accordance with a concurrent transmission capability of the apparatus;

means for identifying, based at least in part on link budget requirements for each PSFCH transmission of the quantity of the PSFCH transmissions, one or more numbers of the PSFCH transmissions, of the quantity of the PSFCH transmissions included in each candidate set, wherein the one or more numbers of the PSFCH transmissions are identified in accordance with a transmit power constraint;

means for selecting at least one candidate set that includes the one or more numbers of the PSFCH transmissions from the one or more candidate sets based at least in part on a priority associated with each PSFCH transmission of the quantity of the PSFCH transmissions in the at least one candidate set; and means for transmitting the at least one candidate set in a HARQ feedback occasion.

27. The apparatus of claim 26, wherein the one or more numbers is more than one number for the PSFCH transmissions.

28. The apparatus of claim 26, wherein the transmit power constraint is a power backoff based at least in part on one or more of a maximum power reduction (MPR) value or a maximum transmit power capability of the apparatus.

29. The apparatus of claim 26, wherein the concurrent transmission capability corresponds to a parameter configured by a network entity, and wherein the parameter is based at least in part on congestion corresponding to a sidelink channel in the HARQ feedback occasion.

30. The apparatus of claim 26, wherein the transmit power constraint includes one or more power sharing rules to be applied to the PSFCH transmissions, and wherein the one or more power sharing rules include allocating total available transmit power to the PSFCH transmissions based on priorities associated with the PSFCH transmissions.

* * * * *